US012770368B2

(12) United States Patent
Fawaz et al.

(10) Patent No.: US 12,770,368 B2
(45) Date of Patent: Oct. 20, 2026

(54) BODY TYPE CLASSIFICATION OF CONTENT

(71) Applicant: Pinterest, Inc., San Francisco, CA (US)

(72) Inventors: Nadia Fawaz, Santa Clara, CA (US); Anh Tuong Ta, Orinda, CA (US); Rohan Mahadev, New York, NY (US); Bhawna Juneja, Belmont, CA (US); Pedro Silva do Nascimento Neto, San Jose, CA (US); Sujay Khandagale, Sunnyvale, CA (US); Kevin Bannerman Hutchful, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 382 days.

(21) Appl. No.: 18/487,645

(22) Filed: Oct. 16, 2023

(65) Prior Publication Data

US 2025/0078460 A1 Mar. 6, 2025

Related U.S. Application Data

(60) Provisional application No. 63/580,164, filed on Sep. 1, 2023.

(51) Int. Cl.
*G06V 10/764* (2022.01)
*G06F 16/58* (2019.01)
*G06T 7/90* (2017.01)

(52) U.S. Cl.
CPC ........ *G06V 10/764* (2022.01); *G06F 16/5866* (2019.01); *G06T 7/90* (2017.01); *G06T 2207/10024* (2013.01)

(58) Field of Classification Search
CPC ...... G06T 7/90; G06V 10/762; G06V 10/761; G06V 10/752; G06V 10/764
(Continued)

(56) References Cited

U.S. PATENT DOCUMENTS

| | | | |
|---|---|---|---|
| 9,251,591 | B2 | 2/2016 | Song et al. |
| 10,321,728 | B1 | 6/2019 | Koh et al. |

(Continued)

OTHER PUBLICATIONS

Ashmawi, S., Alharbi, M., Almaghrabi, A. and Alhothali, A., 2019. FITME: Body Measurement Estimations Using Machine Learning Method. Procedia Computer Science, 163, pp. 209-217, URL: https://www.sciencedirect.com/science/article/pii/S1877050919321416.

(Continued)

*Primary Examiner* — Jamares Q Washington
(74) *Attorney, Agent, or Firm* — Gustafson IP

(57) ABSTRACT

Described are systems and methods to determine body types of individuals represented in content items. The determined body types may be associated with the content items to facilitate indexing, filtering, diversifying, etc. of the content items based on the determined body types. In exemplary implementations, a corpus of content items may be associated with an embedding vector that includes a representation of the content item. The embedding vectors associated with each content item can be provided as inputs to a trained machine learning model, which can process the embedding vectors to determine one or more body types of individuals represented in each content item while eliminating the need for performing image pre-processing prior to determination of the body type(s) presented in the content item.

21 Claims, 14 Drawing Sheets

200

(58) Field of Classification Search
USPC .................................................. 382/224, 159
See application file for complete search history.

(56) References Cited

U.S. PATENT DOCUMENTS

| | | | | |
|---|---|---|---|---|
| 11,222,434 | B2 | 1/2022 | D'souza et al. | |
| 2010/0111370 | A1* | 5/2010 | Black | G06F 18/2321 705/26.1 |
| 2015/0339542 | A1* | 11/2015 | Bercovich | G06F 18/24 382/305 |
| 2021/0049811 | A1* | 2/2021 | Fedyukov | G06T 7/60 |
| 2022/0188897 | A1* | 6/2022 | Szeli | G06T 7/70 |
| 2022/0230344 | A1* | 7/2022 | Singhal | G06T 7/174 |

OTHER PUBLICATIONS

Tao, Juneta, "Deep Neural Network Based Body Measurements Estimation," www.medium.com; Medium, accessed Jun. 27, 2023, URL: https://medium.com/@juneta.tao/deep-neural-network-based-body-measurements-estimation-1a6d54d967e4, 12 pages.

* cited by examiner

BODY TYPE CLASSIFICATION OF CONTENT

CROSS-REFERENCE TO PRIOR APPLICATIONS

This application claims priority to U.S. Provisional Patent Application No. 63/580,164, filed on Sep. 1, 2023 and entitled "BODY SIZE CLASSIFICATION OF CONTENT," the contents of which are hereby incorporated by reference herein in its entirety.

BACKGROUND

The amount of accessible content on the Internet is ever expanding. For example, there are many online services that host and maintain content for their users and subscribers. With the sheer volume of accessible content, it can be difficult for users to find and access relevant content. For example, identifying the proper keywords or queries to obtain relevant content can be difficult. Further, browsing content returned in response to a query to identify relevant content within search results can also be time consuming and difficult.

DETAILED DESCRIPTION

Figure 1A:
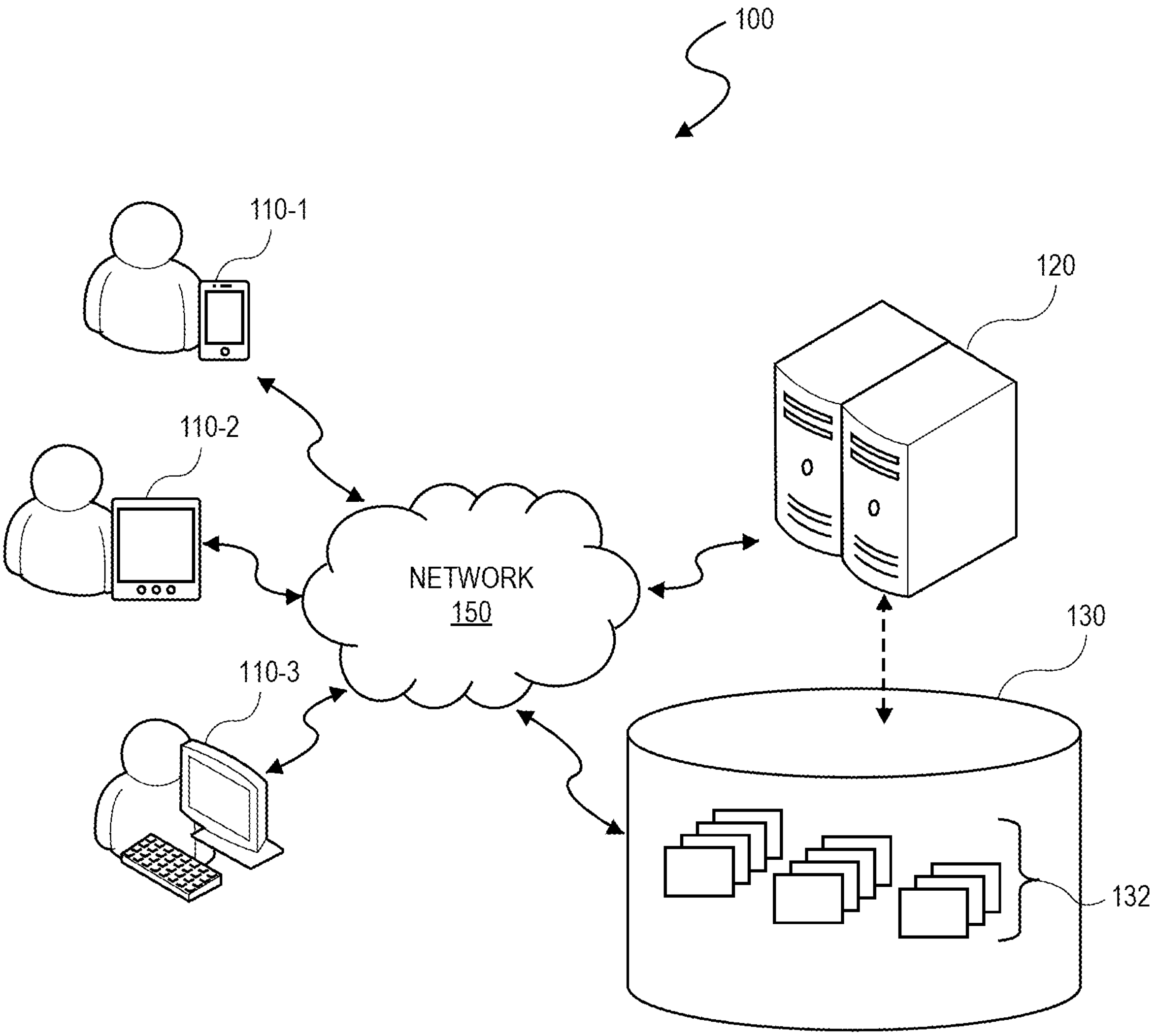
FIGS. 1A and 1B are illustrations of an exemplary computing environment, according to exemplary embodiments of the present disclosure.

As is set forth in greater detail below, embodiments of the present disclosure are generally directed to systems and methods for determining one or more body types of individuals represented in content items, such as images. The determined body types may correspond to, for example, the physique, size, body shape, and the like of individual(s) represented in the content items and may be associated with the content items to facilitate indexing, filtering, etc. of the content items based on the determined body types. According to aspects of the present disclosure, the body types determined in connection with the content items may be limited to the body type of the individual(s) represented in the content items and is not configured to predict clothing sizes and/or infer any health-related parameters. In exemplary implementations, a corpus of content items including visual representations of individuals of various body types may be stored and maintained. Each content item of the corpus of content items may be associated with a multi-dimensional embedding vector configured to encode various features as a representation of the content item.

The embedding vectors associated with each content item can be provided as inputs to a trained machine learning model, which can process the embedding vectors to determine one or more body types of individuals presented in each content item and associate the determined body types to the respective content item. According to exemplary implementations, the trained machine learning model may include a classifier that generates a plurality of body type prediction scores. Each body type prediction score may correspond to a range of body types, and the body type(s) associated with each content item may be based on the body type prediction scores. Advantageously, embodiments of the present disclosure can determine body types of individuals represented in a content item based on the embedding vector that is representative of the content item (e.g., in its entirety/as a whole), so as to eliminate the need for performing image pre-processing (e.g., image segmentation, background subtraction, object detection, etc.) in connection with the content item prior to determination of the body type(s) of the individual(s) represented in the content items.

In exemplary implementations, the body types determined and associated with content items of the corpus of content items hosted and maintained by an online service may facilitate searching, filtering, indexing, providing recommendations, etc. of the corpus of content items. For example, after the body types of individuals represented in a corpus of content items has been determined, the determined body type(s) may be associated with each corresponding content item from the corpus of content items. The determined and associated body types can be utilized in identifying content items to present to a user of the online service in response to a request for content items, such as a query, a content recommendation, a request for a home page, and the like. Accordingly, the determined body types associated with each content item of the corpus of content items can be used to facilitate searching, filtering, indexing, etc. of the corpus of content items.

Although embodiments of the present disclosure are described primarily with respect to processing content items, such as digital images, to determine, filter, index, etc. body types presented in the content items, embodiments of the present disclosure can be applicable to any other features, attributes, characteristics, etc. presented in content items, such as, for example, skin tones, hair patterns, and the like.

Figure 1B:
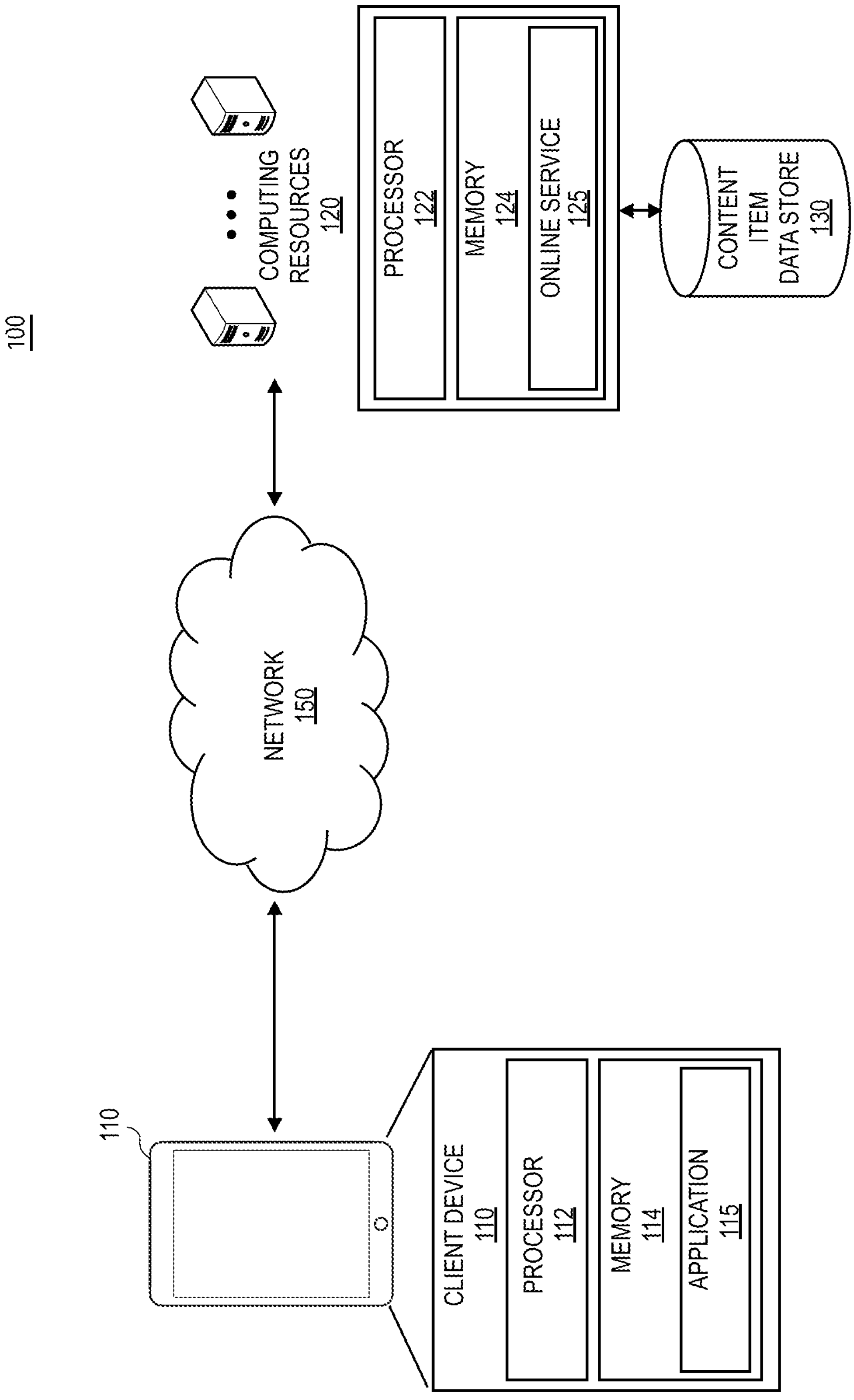

FIGS. 1A and 1B are illustrations of an exemplary computing environment 100, according to exemplary embodiments of the present disclosure.

As shown in FIGS. 1A and 1B, computing environment 100 may include one or more client devices 110 (e.g., client devices 110-1, 110-2, and/or 110-3), also referred to as user devices, for connecting over network 150 to access computing resources 120. Client device 110 may include any type of computing device, such as a smartphone, tablet, laptop computer, desktop computer, wearable, etc. and may include one or more processors 112 and one or more memory 114, which may store one or more applications, such as application 115. Further, network 150 may include any wired or wireless network (e.g., the Internet, cellular, satellite, Bluetooth, Wi-Fi, etc.) that can facilitate communications between client device 110 and computing resources 120. Computing resources 120 may include one or more processor(s) 122 and one or more memory 124, which may store one or more applications, such as online service 125, that may be executed by processor(s) 122 to cause the processor(s) 122 of computing resources 120 to perform various functions and/or actions. According to exemplary embodiments of the present disclosure, online service 125 may be executed by computing resources 120 and may form at least a portion of a social media platform or environment, a networking platform or environment, an e-commerce platform or environment, search engine, or any other form of interactive computing.

According to aspects of the present disclosure, computing resources 120 may represent at least a portion of a networked computing system that may be configured to provide online applications, services, computing platforms, servers, and the like, that may be configured to execute on a networked computing system. In exemplary implementations of the present disclosure, computing resources 120 may be representative of computing resources that may form a portion of a larger networked computing platform (e.g., a cloud computing platform, and the like), which may be accessed by client device 110. Computing resources 120 may provide various services and/or resources and do not require end-user knowledge of the physical premises and configuration of the system that delivers the services. For example, computing resources 120 may include "cloud computing platforms," "on-demand computing platforms," "software as a service (SaaS)," "infrastructure as a service (IaaS)," "platform as a service (PaaS)," "platform computing," "network-accessible platforms," "data centers," "virtual computing platforms," and so forth. Example components of a remote computing resource, which may be used to implement computing resources 120, are discussed below with respect to FIG. 8.

Further, as shown in FIGS. 1A and 1B, computing resources 120, and online service 125, may communicate with one or more datastore(s), such as content item datastore 130. Content item datastore 130 may be configured to store and maintain a corpus of content items 132 (e.g., digital images, videos, etc.), which may include content items that include representations of individuals having various body types. Further, each content item 132 may be associated with a multi-dimensional embedding vector that encodes features of each respective content item to represent each respective content item. Accordingly, content item datastore 130 may also be configured to store and maintain the corresponding embedding vectors of each content item 132. According to certain aspects of the present disclosure, the content items stored and maintained by content item datastore 130 may be stored and maintained as a content graph, taxonomy, and the like.

As illustrated in FIGS. 1A and 1B, one or more of client devices 110 may access remote computing resources 120, via network 150, to access online service 125, which may form a portion of a social media platform, a social networking service, a recommendation service, a search service, and the like. According to embodiments of the present disclosure, client devices 110 may access and/or interact with one or more services executing on remote computing resources 120 through network 150 via one or more applications operating and/or executing on client devices 110, such as application 115. For example, users associated with client devices 110 may launch and/or execute application 115 on client devices 110 to access and/or interact with online service 125 executing on remote computing resources 120 through network 150. According to aspects of the present disclosure, a user may, via execution of application 115 on client devices 110, access or log into services executing on remote computing resources 120 by submitting one or more credentials (e.g., username/password, biometrics, secure token, etc.) through a user interface presented on client devices 110.

Once logged into services executing on remote computing resources 120, the user associated with one of client devices 110 may access and/or otherwise consume content hosted by online services 125 in response to a request for content items. For example, the request for content items may be included in a query (e.g., a text-based query, an image query, etc.), a request to access a homepage and/or home feed, a request for recommended content items, and the like. Alternatively and/or in addition, online service 125 executing on remote computing resources 120 may push content items to client devices 110. For example, online service 125 executing on remote computing resources 120 may push content items to client devices 110 on a periodic basis, after a certain time has elapsed, based on activity associated with client devices 110, upon identification of relevant and/or recommended content items that may be provided to client devices 110, and the like.

In exemplary implementations of the present disclosure, online service 125 may employ one or more trained machine learning models (e.g., such as a deep neural network ("DNN"), or other machine learning models) that have been trained to determine one or more body types of individual represented in a corpus content items, such as content items 132. According to exemplary embodiments of the present disclosure, the embedding vector associated with each content item 132 may be processed by the trained machine learning model to determine one or more body types of individuals represented in each respective content item 132. According to certain aspects of the present disclosure, the one or more body types may correspond to, for example, the physique, size, body shape, and the like of individual(s) represented in the content items. Preferably, the embedding vectors associated with each content item 132 include multi-dimensional vectors encoding features of each respective content item 132 to represent the entirety of each respective content item 132, such that the trained machine learning model is trained to determine body types of individuals represented in content items 132 without performing pre-processing (e.g., object detection, background subtraction, image segmentation, or other imaging processing) of content items 132.

According to exemplary embodiments of the present disclosure, the trained machine learning models can include a classifier configured to receive the embedding vector for a content item as an input, and output one or more body type prediction scores for the content item. Each body type prediction score may correspond to a body type range and may include a floating-point number that represents a likelihood that the corresponding body type range corresponds to a body type of an individual represented in the content item and the sum of the body type prediction scores is 1.0. Accordingly, each content item may be assigned a body type prediction score for each body type range learned by the classifier. In an exemplary implementation, the classifier may be trained to classify each content item into any number of body type ranges. For example, the classifier may be trained to classify each content item into five body type ranges (e.g., lower, lower-middle, upper-middle, upper, and unknown). Classification of each content item into the five body type ranges may be based on prediction scores that are determined for one or more of the body type ranges—one for the lower range, one for the lower-middle range, one for the upper-middle range, one for the upper range, and/or one for the unknown body type range. According to aspects of the present disclosure, classification of a content item into the unknown body type range may be learned by the classifier and/or be based on the prediction scores for one or more of the other body type ranges (e.g., all the prediction scores for the body type ranges are below a threshold value, all the prediction scores for the body type ranges are zero, a difference between the prediction scores for two or more body type ranges are within a threshold value, and the like). According to an exemplary embodiment of the present disclosure, content items 132 stored and maintained in content item datastore 130 may be processed by the trained machine learning model to determine the body type prediction scores for each content item 132.

After the body type prediction scores have been determined for content items 132, one or more of the body type ranges may be associated with each content item 132 based on the body type prediction scores. According to an exemplary implementation, the body type range corresponding to the highest body type prediction score for a content item may be associated with each content item. Continuing the example where the classifier is trained on five body type ranges (e.g., lower, lower-middle, upper-middle, upper, and unknown), the body type range corresponding to the highest body type prediction score of the five body type prediction scores may be associated with each content item. According to another exemplary implementation, the body type range (s) corresponding to body type prediction scores that exceed a threshold may be associated with each content item. In an example where the classifier is trained on five body type ranges (e.g., lower, lower-middle, upper-middle, upper, and unknown) and a threshold is determined to be 0.2, all the body type ranges with corresponding body type prediction scores above 0.2 may be associated with each content item 132. For example, if body type prediction scores associated with each of body type ranges lower, lower-middle, upper-middle, and upper exceed 0.2 for a particular content item, then the body type ranges or body type ranges lower, lower-middle, upper-middle, and upper may all be associated with the content item. As described above, in connection with the unknown body type range, classification into the unknown body type range may be learned by the classifier and/or be based on the prediction scores for one or more of the other body type ranges (e.g., all the prediction scores for the body type ranges are below a threshold value, all the prediction scores for the body type ranges are zero, a difference between the prediction scores for two or more body type ranges are within a threshold value, and the like).

Accordingly, the body type range determined and associated with each content item 132 may be associated, stored, and maintained with content item 132 in content item datastore 130. The determined body type(s) associated with each content item 132 can be used to facilitate searching, filtering, indexing, identifying, recommending, etc. content items 132 in response to requests for content items. According to certain aspects, the determined body type associated with each content item 132 may be utilized in the event that any of content items 132 are used as part of a training dataset for a machine learning system to ensure that the training dataset represents a diverse dataset with respect to body types represented in the content items of the training dataset. Additionally, the determined body types associated with each content item 132 can also be used in connection with one or more recommendation systems configured to recommend content items to a user (e.g., associated with client devices 110, etc.).

In an exemplary implementation, a user associated with one of client devices 110 may submit a request for content items (e.g., via a text-based query, an image query, a request to access a homepage and/or home feed, a request for recommended content items, and the like, etc.). In connection with identifying and returning content items relevant and/or responsive to the request for content items, online service 125 may utilize the body types associated with content items 132. For example, in identifying relevant and/or responsive content items from content items 132, online service 125 may ensure that the presented content items include a diverse sampling of responsive content items that include representations of individuals having a variety of body types based on the associated body type ranges. Also, online service 125 may also process the request for content items to determine whether the diversification and/or filtering of the identified content items based on body types may be triggered. For example, in an exemplary implementation where the request for content items includes a query, the query may be analyzed to determine if the query has relevance to diversifying and/or filtering content by body type ranges (e.g., queries related to fashion, beauty, and the like), if the query is sufficiently generic to allow diversifying and/or filtering by body types (e.g., the query does not include keywords directed to a specific body type, etc.), and the like. Accordingly, a query relating to cars or airplanes would likely not trigger diversifying and/or filtering by body type, whereas queries relating to fashion, clothes, looks worn by celebrities, and the like may trigger diversifying and/or filtering by body type. Consequently, queries that may specify a certain body type (e.g., "plus size, "skinny," etc.) may not trigger diversifying and/or filtering by body type. According to certain aspects of the present disclosure, determination of whether a query triggers diversifying and/or filtering by body type may be different based on geography, location, etc.

In exemplary implementations where content items responsive to a request for content items have been identified and it has been determined that the query triggers diversifying and/or filtering based on body type, an inventory of the responsive content items in each body type range may be determined. The inventory for each body type category may be used to determine whether to enable filtering based on body type and/or the body type ranges that may be made available for filtering. For example, if the determined inventory indicates that the responsive content items only include body type categorized as lower-middle type, filtering based on body type may not be made available since only one range of body type is represented in the responsive content items. Similarly, if the determined inventory indicates that sufficient inventory exists for body type ranges lower, lower-middle, and upper-middle, filtering based on body type may be enabled and made available for body type ranges lower, lower-middle, and upper-middle, while filtering based on body type range upper may not be made available. Accordingly, the determined inventory for each body type range may be compared against a threshold to determine whether sufficient inventory exists for two or more body type ranges to enable and/or make filtering based on body type ranges available and/or determining which body type ranges to make available for filtering. In exemplary implementations, if it is determined that sufficient inventory exists for two or more body type ranges, filtering based on body type may be enabled for the body type ranges for which sufficient inventory exists. The threshold value may include a predetermined value, a ratio or relative value based on the total number of responsive content items and/or the inventory for each body type range, and the like.

In other exemplary embodiments, online service 125 may store and maintain keywords, images, and/or queries (e.g., text-based queries, image-based queries, and the like) that may trigger diversifying and/or filtering of responsive content items based on body type ranges. For example, online service 125 may identify keywords and/or queries that may trigger diversifying and/or filtering based on body type ranges based on the relevance of the queries to body type ranges (e.g., queries related to fashion, beauty, hairstyles, makeup, and the like, as well as whether the query is sufficiently generic to allow filtering by body type ranges—e.g., the query does not include keywords directed to a specific body type ranges, etc.). Alternatively and/or in addition, a trained machine learning model configured to determine query intent may be employed to determine whether the query triggers diversifying and/or filtering content based on body type ranges. According to certain aspects of the present disclosure, the query intent may be based on, for example, one or more text queries, image queries, user profile information (e.g., user embedding representative of the user, etc.), and the like. Additionally, it may further be determined whether the queries include sufficient inventory of responsive content items associated with at least one of the body type ranges, so as to facilitate diversifying and/or filtering based on body type ranges. Accordingly, the identified queries may be used to generate, store, and maintain a corpus of keywords, images, and/or queries that may trigger diversifying and/or filtering based on body type ranges, which may be periodically updated (e.g., as additional content items become available, etc.). Optionally, a generated and stored corpus of keywords, images, and/or queries may be used to train a machine learning model that would learn the triggering of diversification and/or filtering based on body type ranges. Alternatively, if it is determined that a certain query is not relevant to diversifying and/or filtering based on body type ranges and/or does not include sufficient inventory for one or more of the body type ranges, then it may be determined that the query in question does not trigger diversifying and/or filtering based on body type ranges and may be excluded from the corpus of queries.

Accordingly, as queries are received from client devices 110, online service 125 may process the received query to determine whether the received query (and/or the words forming the query) triggers diversifying and/or filtering based on body type ranges. Additionally, in connection with received queries that are not included in the corpus of maintained keywords and/or queries such that diversifying and/or filtering based on body type ranges is not triggered, online service 125 may present one or more recommended keywords and/or queries (e.g., as an autocomplete suggestion, etc.) from the corpus of maintained keywords and/or queries that may trigger diversifying and/or filtering based on body type ranges.

In exemplary implementations where it is determined that a query submitted by a user associated with client device 110 triggers diversifying and/or filtering by body type ranges and sufficient inventory exists to enable diversifying and/or filtering based on body type ranges, online service 125 may cause a user interface to be presented on a display of client device 110 to facilitate filtering of the responsive content items based on body type ranges. For example, the user interface may present the content items responsive to the query and a body type ranges filtering control, which can facilitate filtering of the responsive content items by body type ranges. Accordingly, a user may interact with the body type range filtering control via client device 110 to select and/or deselect one or more body type ranges to filter the responsive content based on the selected body type ranges. In response to the interaction with the body type ranges filtering control to select one or more of the body type ranges, the user interface may be modified to only display the content items including the selected body type ranges. The user interface facilitating filtering based on body type ranges is described in further detail herein in connection with FIGS. 4A-4E.

Figure 2:
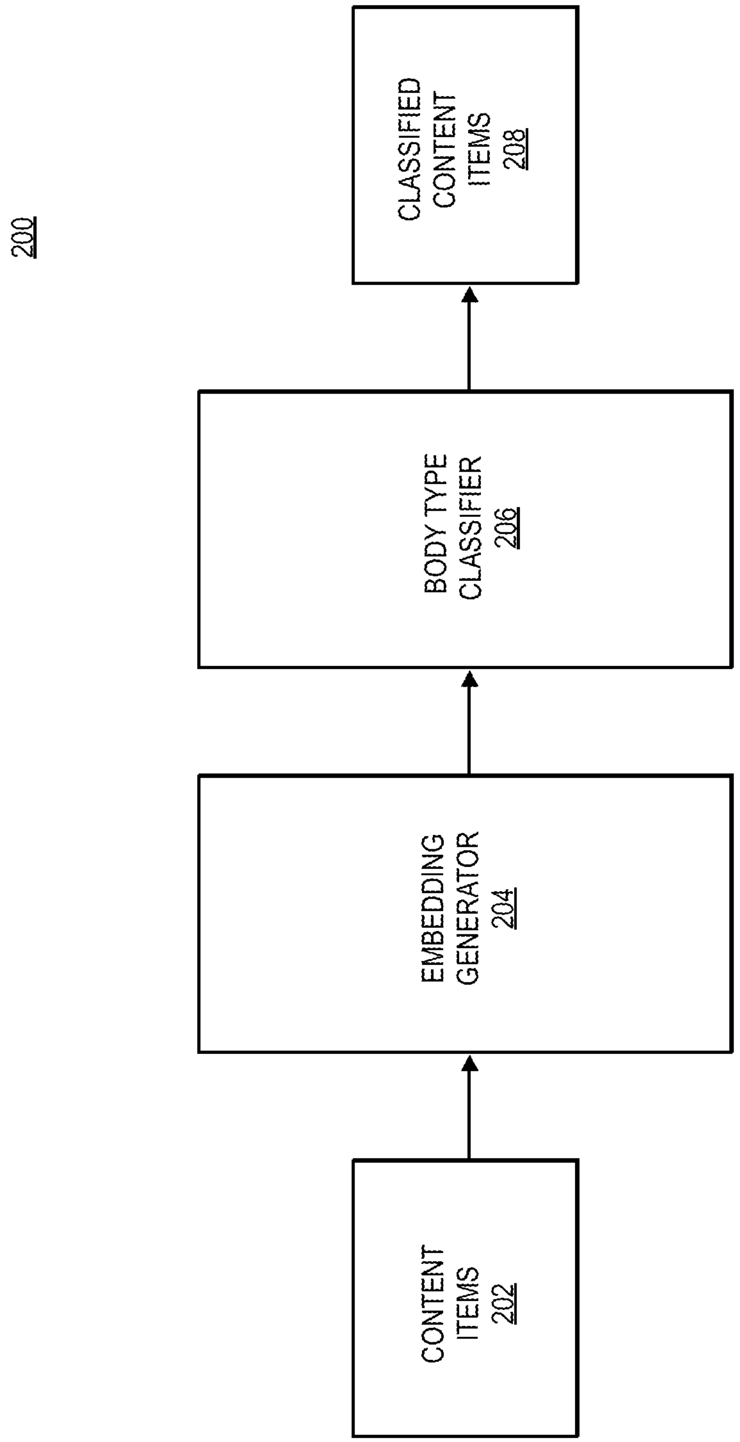
FIG. 2 is a block diagram illustrating an exemplary process flow, according to exemplary embodiments of the present disclosure.

FIG. 2 is a block diagram illustrating an exemplary process flow 200, according to exemplary embodiments of the present disclosure.

As shown in FIG. 2, content items 202 (e.g., content items 132, etc.) may be processed by embedding generator 204 to generate embeddings representative of content items 202, which in turn may be provided as an input to body type classifier 206, which may be configured to classify content items 202, based on the embeddings generated by embedding generator 204, and output classified content items 208. According to exemplary embodiments of the present disclosure, content items 202 may represent a corpus of content items (e.g., digital images, videos, etc.), embedding generator 204 may include one or more trained machine learning models configured to generate embeddings representative of content items, and body type classifier 206 may include one or more trained machine learning models configured to generate body type prediction scores corresponding to body type ranges of individuals represented in the content items.

In exemplary implementations, content items 202 may be processed by embedding generator 204 to generate multi-dimensional embedding vectors encoding features of each respective content item 202 that represent the entirety of each respective content item 202. The embedding vectors generated by embedding generator 204 may represent an entirety of each content item 202, such that body type classifier 206 may classify each content item 202 without performing pre-processing (e.g., object detection, background subtraction, image segmentation, or other imaging processing) of content items 202. Accordingly, the embedding vectors generated by embedding generator 204 may be provided to body type classifier 206, which may be configured to generate, based on the embedding vectors, one or more body type prediction scores for each content item 202, where each body type prediction score corresponds to a body type range learned by body type classifier 206. For example, in an exemplary implementation where body type classifier 206 is classifying each content item into five body type ranges, body type classifier 206 may generate five body type prediction scores, with each body type prediction score corresponding to a respective body type range.

In exemplary implementations, the body type prediction score for a particular body type range may include a floating-point number between 0 and 1.0 that represents a likelihood that the content item includes a representation of an individual having a body type that falls within the particular body type range. Accordingly, in exemplary implementations where body type classifier 206 is trained to classify each content item into five body type ranges (e.g., lower, lower-middle, upper-middle, upper, and unknown), in connection with a content item including a representation of an individual having a body type that falls within the lower-middle range, the body type prediction scores for body type ranges lower, upper-middle, and upper may be 0.0, while the body type prediction scores for body type range lower-middle may be a non-zero value (e.g., 0.2, 0.3, 0.5, 0.6, etc.). Similarly, in connection with a content item including a representation of a first individual having a body type that falls within the lower-middle range and a second individual having a body type that falls within the upper range, the body type prediction scores for body type ranges lower and upper-middle may be 0.0, while the body type prediction scores for body type ranges lower-middle and upper may be non-zero values (e.g., 0.2, 0.3, 0.5, 0.6, etc.). Alternatively and/or in addition, the classified body type range(s) may be based on which body type prediction score is the highest amongst all the body type prediction scores, which body type prediction scores exceed a threshold value, and the like.

According to certain aspects of the present disclosure, body type classifier 206 may include multiple classifiers based on demographic information associated with content items 202. For example, as body type classifications may not be consistent across certain demographic groups (e.g., based on age, gender, certain disabilities, etc.), body type classifier 206 may employ separate classifiers for classifying content items including representations of individuals associated with different demographic groupings. Accordingly, exemplary embodiments of the present disclosure contemplate training multiple classifiers based on certain demographic information to classify content items including representations of individuals belonging certain demographic groups (e.g., based on age, gender, certain disabilities, etc.) to obtain more accurate classifications of the content items.

After body type classifier 206 has processed the embedding vectors generated for content items 202 to generate body type prediction scores for content items 202, one or more body type ranges may be determined and/or associated with each content item 202 based on the body type prediction scores in generating classified content items 208. For example, in one exemplary implementation, the body type range corresponding to the highest body type prediction score for a content item may be associated with the content item. In another exemplary implementation, the body type range(s) corresponding to body type prediction scores that exceed a threshold may be associated with each content item. Accordingly, the content items and their associated body type ranges may be provided as classified content items 208.

Figure 3:
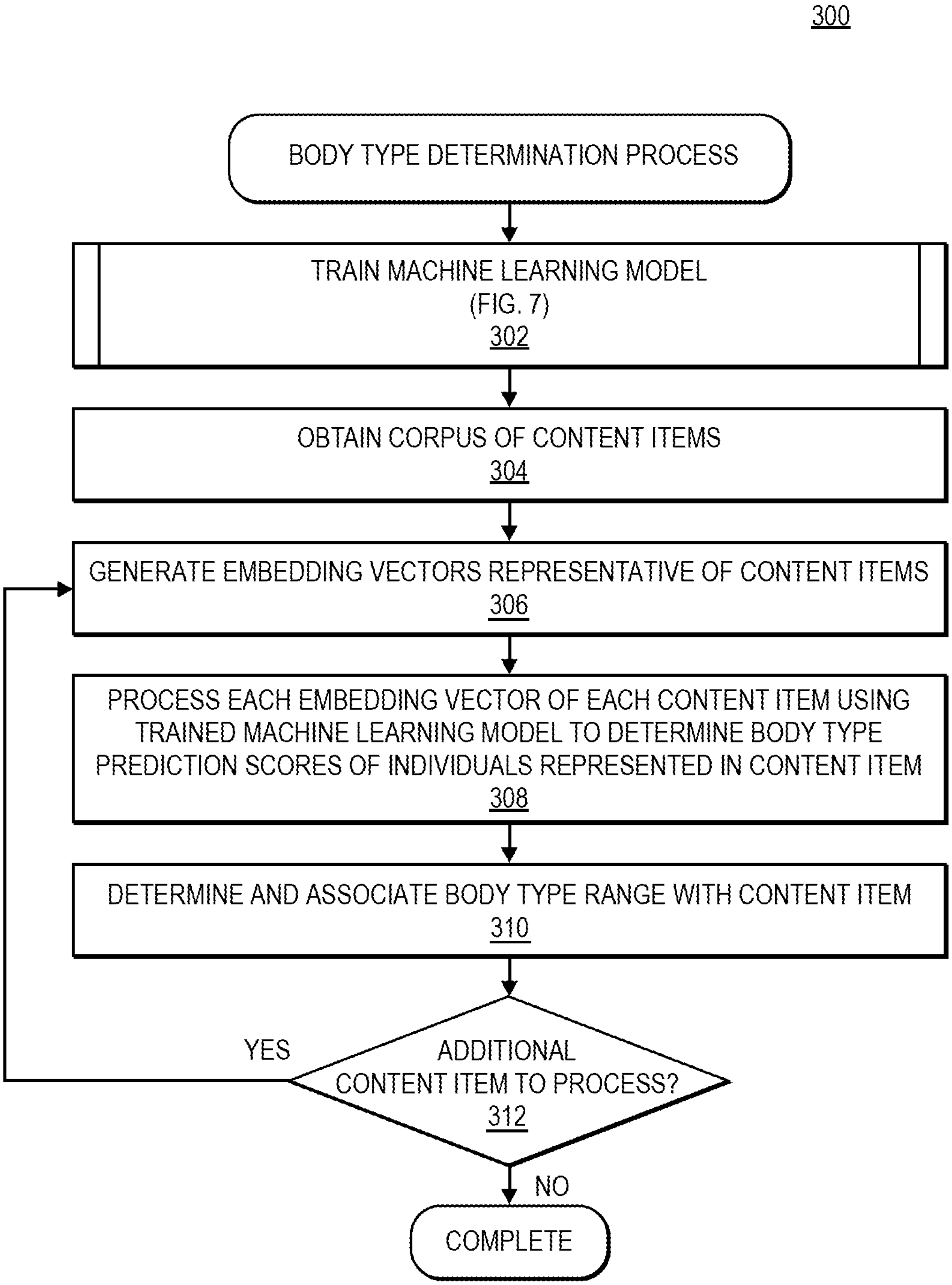
FIG. 3 is a flow diagram of an exemplary body type determination process, according to exemplary embodiments of the present disclosure.

FIG. 3 is a flow diagram of an exemplary body type determination process 300, according to exemplary embodiments of the present disclosure.

As shown in FIG. 3, process 300 may begin at step 302 by training one or more machine learning models to receive an input embedding vector representative of an entirety of a content item and determine one or more body type ranges presented in the content item. According to exemplary embodiments, the trained machine learning model may be configured to classify the body type ranges presented in the content items into various body type ranges by generating body type prediction scores that represent a likelihood that the content item includes a representation of an individual having a body type that falls within each body type range. Training of the machine learning model is described in further detail herein in connection with FIG. 7.

In step 304, a corpus of content items may be obtained. The content items may include digital images, videos, etc. and may include a visual representation of one or more individuals having body types that may fall within various body type ranges. According to certain implementations, the corpus of content items may have been obtained by filtering a larger corpus of content items to obtain content items that may include visual representations of individuals for which a body type may be determined. For example, attributes, parameters, metadata, etc. associated with the content items may be analyzed to discard irrelevant content items that likely do not include visual representations of individuals for which a body type may be determined, so that only content items likely to include a visual representation of one or more individuals for which a body type may be determined forms the corpus of content items obtained in step 304.

In step 306, an embedding vector representative of the content item may be generated and associated with each content item of the corpus of content items. According to aspects of the present disclosure, the embedding vector may be representative of the content item as a whole (e.g., not segments or portions of the content item). As those skilled in the art will appreciate, an "embedding vector" may include an array of values that reflect aspects and features of source/input content. For example, an embedding vector representative of a content item may include an array of values describing aspects and features of the content item. A process, referred to as an embedding vector generator, that generates an embedding vector for input content uses the same learned features to identify and extract information, the results of which leads to the generation of the embedding vector. By way of illustration and not limitation, an embedding vector may comprise 128 elements, each element represented by a 32- or 64-bit floating point value, each value representative of some aspect (or multiple aspects) of the input content. In other implementations, the embedding vector may have additional or fewer elements and each element may have additional or fewer floating-point values, integer values, and/or binary values. According to exemplary implementations of the present disclosure, the generated embedding vector may be represented as a binary representation of the embedding vector. According to certain aspects of the present disclosure, the embedding vectors may be stored and/or maintained as a hierarchical navigable small worlds (HNSW) graph, which may be searched to identify responsive content items. According to certain exemplary implementations, the binary implementation can include 512 bits, 1024 bits, 2048 bits, or any other number of bits.

Regarding embedding vector generators, typically an embedding vector generator accepts input content (e.g., an image, video, or multi-item content), processes the input content through various layers of convolution, and produces an array of values that specifically reflect on the input data, i.e., an embedding vector. Due to the nature of a trained embedding vector generator (i.e., the convolutions that include transformations, aggregations, subtractions, extrapolations, normalizations, etc.), the contents or values of the resulting embedding vectors are often meaningless to a personal examination. However, collectively the elements of an embedding vector can be used to project or map the corresponding input content into an embedding space as defined by the embedding vectors.

The embedding vector associated with the content item can then be processed by the trained machine learning model to determine one or more body type prediction scores corresponding to body type ranges of individuals represented in the content item, as in step 308. Preferably, the embedding vectors associated with each content item is representative of the entirety of the content item and the trained machine learning model is trained so that body type ranges can be determined in the content items without performing any pre-processing (e.g., object detection, background subtraction, image segmentation, or other imaging processing) of the content items prior to determining the body type ranges of individuals represented in the content items.

In exemplary implementations, the body type prediction score for a particular body type range may include a floating-point number between 0 and 1.0 that represents a likelihood that the content item includes a representation of an individual having a body type that falls within the particular body type range. Further, the number of body type prediction scores generated for each content item can vary based on the number of body type ranges into which each content item may be classified. For example, in exemplary implementations where the body type classifier is trained to classify each content item into five body type ranges (e.g., lower, lower-middle, upper-middle, upper, and unknown), five body type prediction scores may be generated. Similarly, in exemplary implementations where the body type classifier is trained to classify each content item into ten body type ranges, ten body type prediction scores may be generated, and so forth. Further, where the content item may include a representation of more than multiple individuals and the multiple individuals have body types falling into multiple body type ranges, the trained machine learning model may determine body type prediction scores for the most dominant and/or prominent individual represented in the content item (e.g., the individual that is the main focus of the content item while other individuals shown in the background), and/or may determine body type prediction scores for all individuals represented in the content item.

After the body type prediction scores have been determined, one or more body type ranges may be determined and associated with the content item, as in step 310. According to an exemplary implementation, the body type range corresponding to the highest body type prediction score for a content item may be associated with the content item. Alternatively and/or in addition, the body type range(s) corresponding to body type prediction scores that exceed a threshold may be associated with each content item. According to yet another exemplary implementation, all the body type ranges having non-zero body type prediction scores may be associated with the content item. According to yet another exemplary implementation, a prominence score of a primary individual represented in the content item may be determined, and if the prominence score exceeds a threshold value, only the body type range corresponding to the primary individual may be associated with the content item, and if the prominence score is below a threshold value, all the body type ranges corresponding to body type prediction scores that exceed a threshold (e.g., 0, 0.1, 0.2, etc.) may be associated with the content item.

In step 312, it may be determined if there is another content item in the corpus of content items for processing. If additional content items remain, process 300 returns to step 306 to process the next content item. If no further content items remain, process 300 may complete.

FIGS. 4A-4E are illustrations of exemplary user interfaces 400, 410, 420, 440, and 450, according to exemplary embodiments of the present disclosure.

Figure 4A:
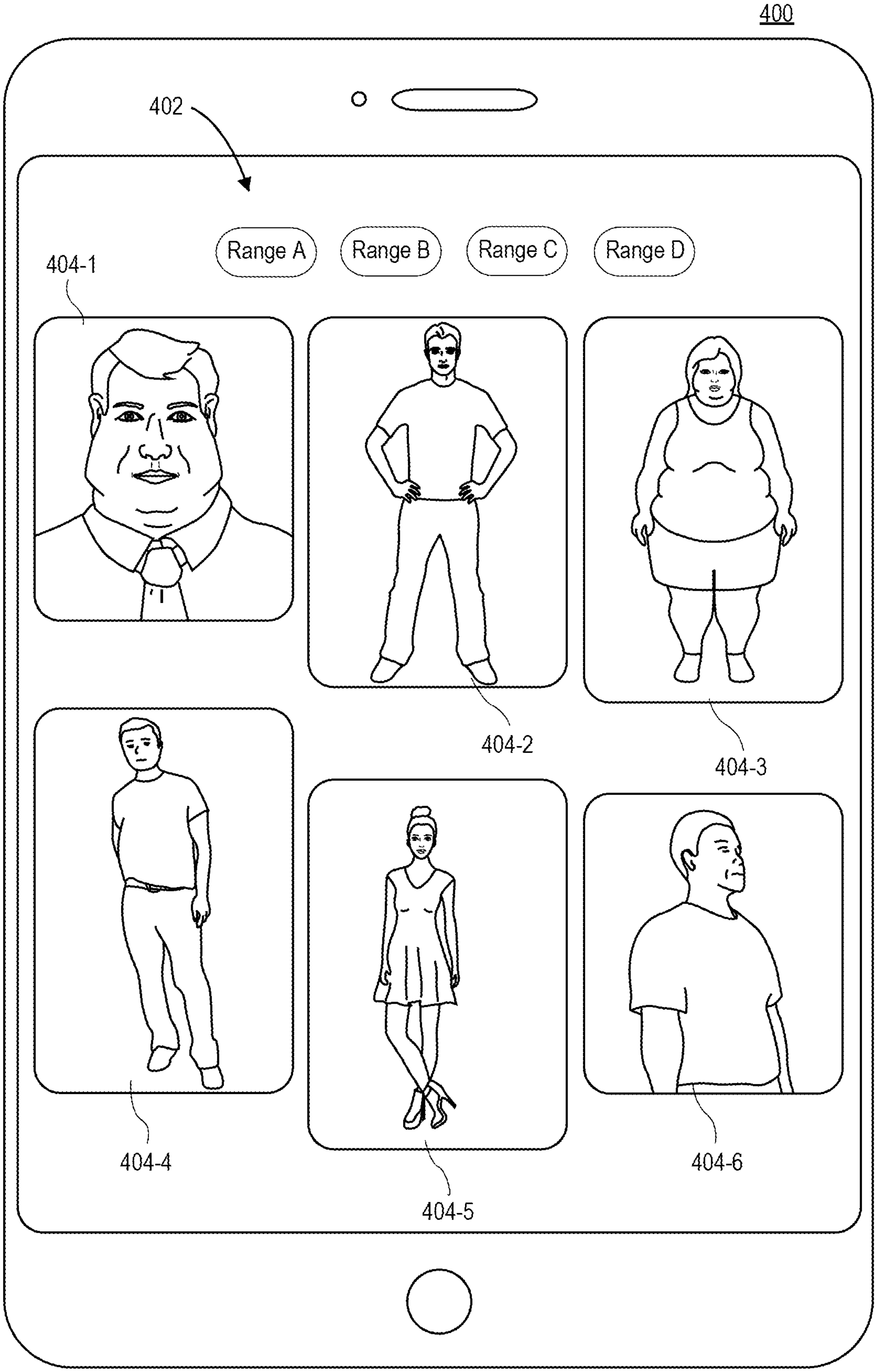
FIGS. 4A-4E are illustrations of exemplary user interfaces, according to exemplary embodiments of the present disclosure.

As shown in FIG. 4A, user interface 400 may present body type range filter control 402 and content items 404 (e.g., 404-1, 404-2, 404-3, 404-4, 404-5, and/or 404-6). In exemplary implementations, user interface 400 may be presented on a display of a client device (e.g., client device 110) in response to a request for content items (e.g., query submitted by a user associated with the client device, request to access a home page, etc.). For example, user interfaces 400, 410, 420, 440, and 450, as shown in FIGS. 4A-4E, may be presented on a display of a client device in response to a query after it has been determined that the query submitted by the user triggers filtering based on body type ranges and that sufficient inventory exists for each of the body type range filter options included in body type range filter controls 402, 412, 422, 442, and 452.

With respect to FIG. 4A, content items 404-1, 404-2, 404-3, 404-4, 404-5, and/or 404-6 may have been identified (e.g., from a corpus of content items such as content items 132) as content items that are responsive to the query, and the query may have been processed to determine if the query has relevance to filtering by body type ranges (e.g., queries related to fashion, beauty, hairstyles, makeup, and the like), if the query is sufficiently generic to allow filtering by body type ranges (e.g., the query does not include keywords directed to a particular body type range, etc.), and the like. After it has been determined that the query triggers filtering based on body type ranges, an inventory of the responsive content items in each body type range may be determined. For example, in the corpus of responsive content items, the inventory (e.g., the number, a proportional/relative number, etc.) of content items associated with each body type range may be determined. The inventory may be analyzed to determine whether sufficient inventory for each body type range exists to enable filtering based on body type ranges and presentation of each corresponding body type range as an option in body type range filter control 402. In the exemplary implementation illustrated in FIG. 4A, it may have been determined that the query triggers filtering based on body type ranges and that sufficient inventory exists for each of the body type ranges so that each body type range is presented in body type range filter control 402. As shown in FIG. 4A, each selectable body type range (e.g., Range A, Range B, Range C, and/or Range D) included in body type range filter control 402 may correspond to a body type classification (e.g., lower, lower-middle, upper-middle, and/or upper), determined by a trained classifier, as described herein. Further, although FIG. 4A illustrates body type range filter control 402 to include multiple selectable range buttons that include text labels, alternatively and/or in addition, body type range filter control 402 may be implemented as menu options, prepopulated fields, selectable radio buttons, and the like, and may be include images and/or graphical representations of the corresponding body type range, and the like.

Further, content items 404-1, 404-2, 404-3, 404-4, 404-5, and/or 404-6 may have been selected and arranged in the presentation shown in FIG. 4A to ensure that the user is presented with a diverse set of content items. For example, content items 404-1, 404-2, 404-3, 404-4, 404-5, and/or 404-6, which may have been identified as being relevant and/or responsive to a query, may each include a corresponding ranking (e.g., based on relevance), which may also include a diversification component based on one or more attributes such as, for example, body type range, hair pattern, skin tone, gender, age, geographic location, or any other attributes and/or parameters associated with the content items to ensure that a diverse set of content items are presented to the user. In connection with diversification, the body type range with the highest body type prediction score may be assigned to the content item, rather than considering all the body type ranges that may be associated with the content item. The diversification component can be determined using diversification heuristics, a maximal marginal relevance (MMR) approach, a determinantal point processes (DPP) approach, other trained machine learning models and/or probabilistic models, or other algorithms or techniques. Further, the diversification component may be determined in batch. Accordingly, content items 404-1, 404-2, 404-3, 404-4, 404-5, and/or 404-6 may be selected, sorted, arranged, and/or presented based on diversity, in addition to relevance and responsiveness to the query, such that the presented content items are diverse, as well as relevant and responsive to the query.

In the exemplary implementation illustrated in FIG. 4A, body type range filter control 402 may include one or more body type ranges (e.g., Range A, Range B, Range C, Range D, and/or Range E) based on which the user may choose to filter the responsive content items, and the user may interact with body type range filter control 402 to select one or more of the body type ranges (e.g., Range A, Range B, Range C, and/or Range D,) to filter the responsive content items to only display the content items associated with the selected body type ranges. Body type range filter control 402 may also include an interactive feature (e.g., shown as an "i" in a circle, etc.) with which a user may interact (e.g., select, hover over, click, etc.) to obtain further information, descriptions, and the like for each body type range. Accordingly, in response to a selection of one or more body type ranges presented by body type range filter control 402, content items 404-1, 404-2, 404-3, 404-4, 404-5, and/or 404-6 may be filtered to present only the content items associated with the selected body type range(s). Accordingly, the user may then browse, access, or otherwise consume the curated content items which have been filtered based on the selected body type ranges.

FIGS. 4B-4E illustrate exemplary user interfaces, according to exemplary embodiments of the present disclosure. Although the exemplary user interfaces shown in FIGS. 4B-4E illustrate implementations where only one body type range is selected, according to certain aspects of the present disclosure, more than one body type range may be selected, and the content items presented may be filtered based on all the selected body type ranges.

The user interfaces shown in FIGS. 4B-4E may present body type range filter controls 412, 422, 442, and 452, and one or more content items 414, 424, 444, and 454 to the user, and may be presented to the user subsequent to presentation of user interface 400, as shown in FIG. 4A, after the user has made a body type range option selection via an interaction with body type range filter control 402.

Figure 4B:
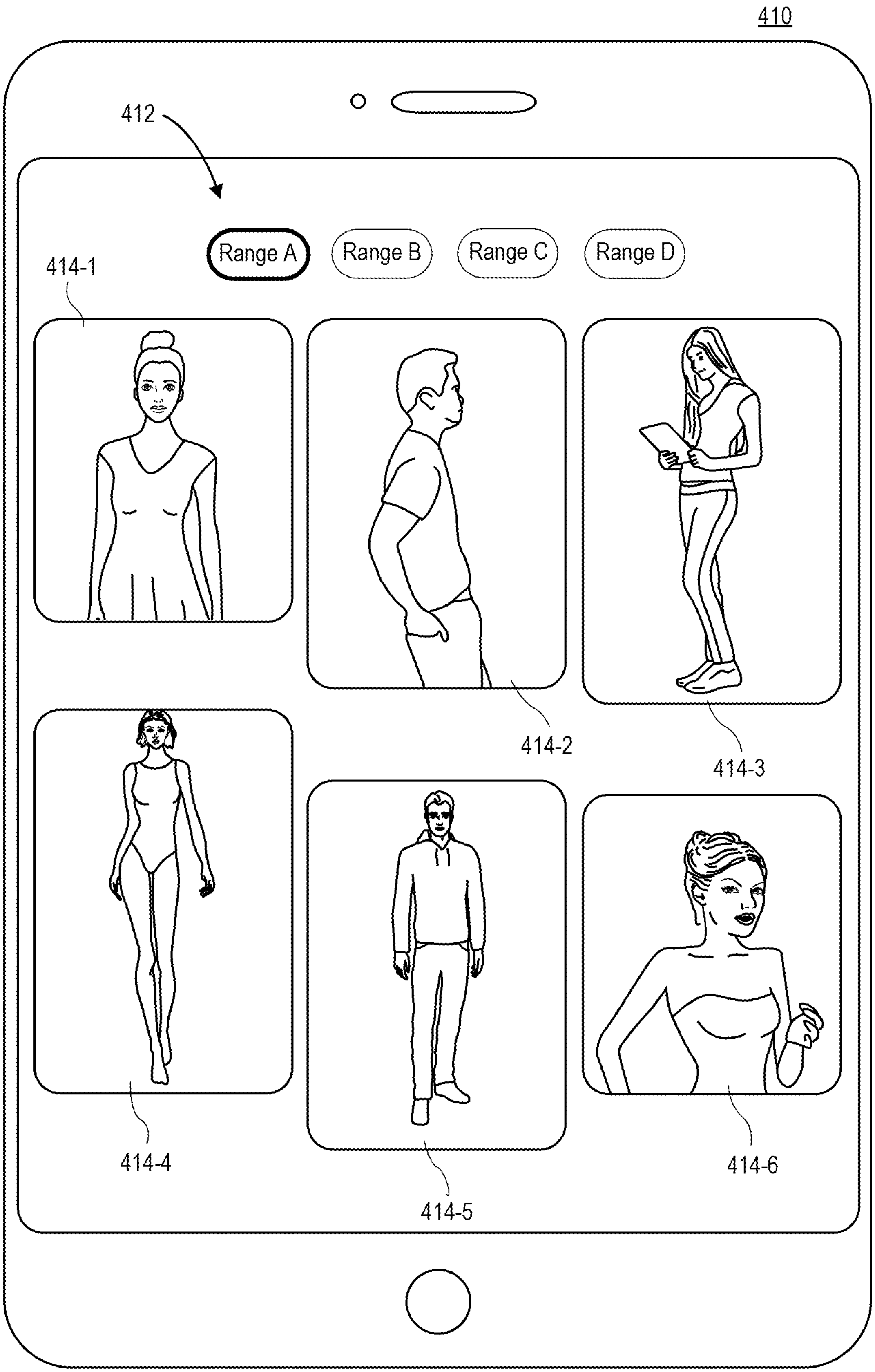

As shown in FIG. 4B, user interface 410 may include body type range filter control 412 and content items 414-1, 414-2, 414-3, 414-4, 414-5, and 414-6. User interface 410 illustrated in FIG. 4B may be presented to the user subsequent to presentation of user interface 400 shown in FIG. 4A (or any of FIGS. 4C-4E) after the user has made a body type range option selection via an interaction with body type range filter control 412.

For example, as shown in FIG. 4B, the RANGE A body type range option is highlighted in body type range filter control 412, indicating that the user has selected the RANGE A body type range option via an interaction with body type range filter control 412. Accordingly, the content items that were identified as being responsive to the query are filtered by the user's choice of the RANGE A body type range option, and only the content items associated with the RANGE A body type range may be presented via user interface 410 to the user. Alternatively and/or in addition, in implementations where the initial responsive content items do not include a sufficient number of content items associated with the RANGE A body type range, the body type range classification RANGE A may not be included in body type range filter control 412, additional responsive content items associated with the RANGE A body type range may be identified (e.g., from the corpus of content items such as content items 132), and the like. Thus, content items 414-1, 414-2, 414-3, 414-4, 414-5, and 414-6, which are presented to the user via user interface 410, may all be associated with the RANGE A body type range. Further, the filtered content items, i.e., content items 414-1, 414-2, 414-3, 414-4, 414-5, and 414-6, may have been selected and arranged in the presentation shown in FIG. 4B to ensure that the user is presented with a diverse set of content items based on one or more attributes (e.g., other than body type range) such as, for example, hair pattern, skin tone, gender, age, geographic location, or any other attributes associated with the content items to ensure that a diverse set of content items are presented to the user. The diversification of the content items may have been determined using one or more of diversification heuristics, a maximal marginal relevance (MMR) approach, a determinantal point processes (DPP), other trained machine learning models and/or probabilistic models, or other algorithms or techniques. Accordingly, content items 414-1, 414-2, 414-3, 414-4, 414-5, and 414-6 may be selected, sorted, arranged, and/or presented based on diversity, in addition to filtering, relevance, and/or responsiveness to the query.

Figure 4C:
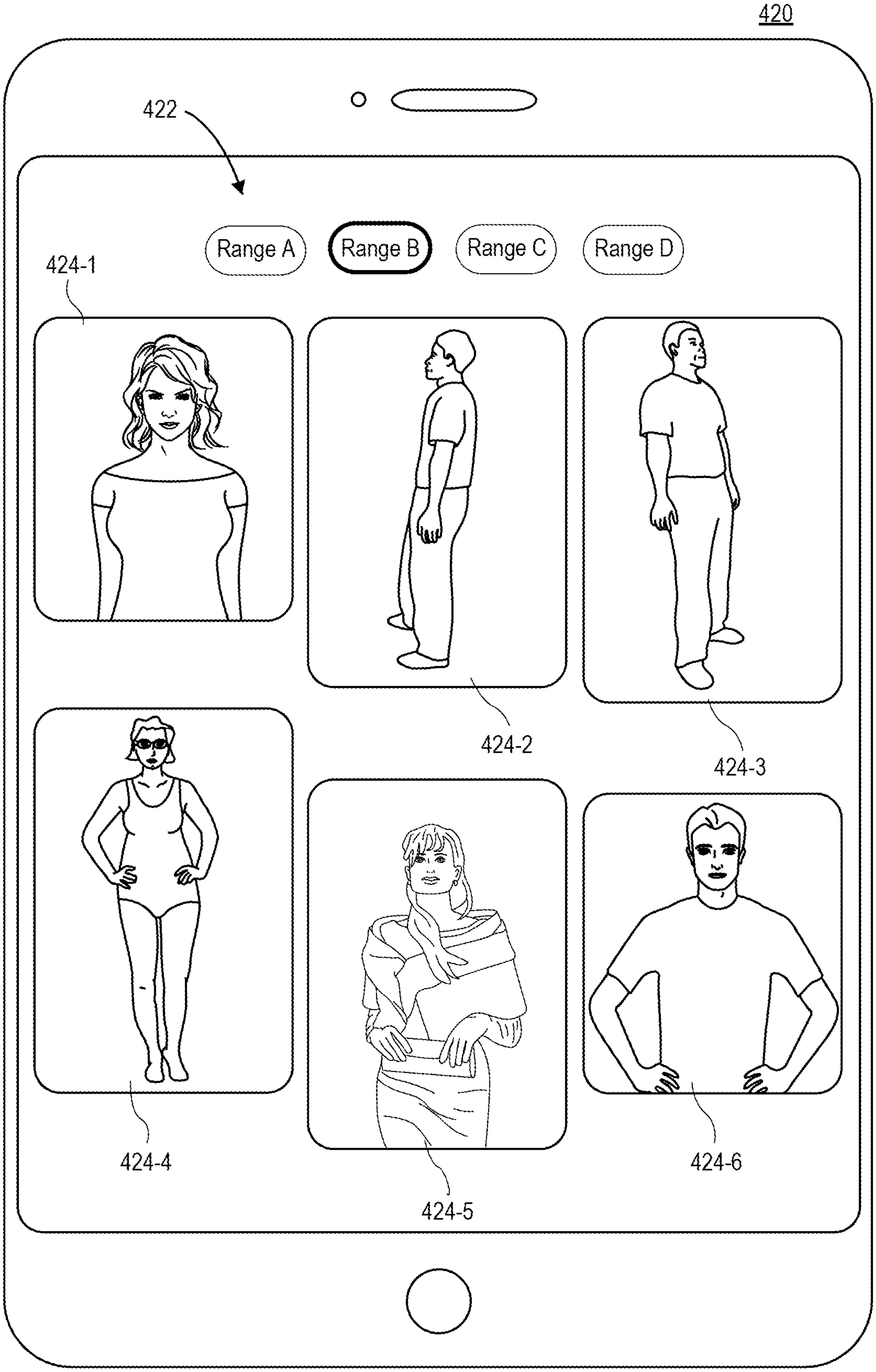

As shown in FIG. 4C, user interface 420 may include body type range filter control 422 and content items 424-1, 424-2, 424-3, 424-4, 424-5, and 424-6. User interface 420 illustrated in FIG. 4C may be presented to the user subsequent to presentation of user interface 400 shown in FIG. 4A (or any of FIG. 4B, 4C, or 4E) after the user has made a body type range option selection via an interaction with body type range filter control 422.

For example, as shown in FIG. 4C, the RANGE B body type range option is highlighted in body type range filter control 422, indicating that the user has selected the RANGE B body type range option via an interaction with body type range filter control 422. Accordingly, the content items that were identified as being responsive to the query are filtered by the user's choice of the RANGE B body type range option, and only the content items associated with the RANGE B body type range may be presented via user interface 420 to the user. Alternatively and/or in addition, in implementations where the initial responsive content items do not include a sufficient number of content items associated with the RANGE B body type range, additional responsive content items associated with the RANGE B body type range may also be identified (e.g., from the corpus of content items such as content items 132). Thus, content items 424-1, 424-2, 424-3, 424-4, 424-5, and 424-6, which are presented to the user via user interface 420, may all be associated with the RANGE B body type range. Further, the filtered content items, i.e., content items 424-1, 424-2, 424-3, 424-4, 424-5, and 424-6, may have been selected and arranged in the presentation shown in FIG. 4C to ensure that the user is presented with a diverse set of content items based on one or more attributes (e.g., other than body type range) such as, for example, hair pattern, skin tone, gender, age, geographic location, or any other attributes associated with the content items to ensure that a diverse set of content items are presented to the user. The diversification of the content items may have been determined using one or more of diversification heuristics, a maximal marginal relevance (MMR) approach, a determinantal point processes (DPP), other trained machine learning models and/or probabilistic models, or other algorithms or techniques. Accordingly, content items 424-1, 424-2, 424-3, 424-4, 424-5, and 424-6 may be selected, sorted, arranged, and/or presented based on diversity, in addition to filtering, relevance, and/or responsiveness to the query.

Figure 4D:
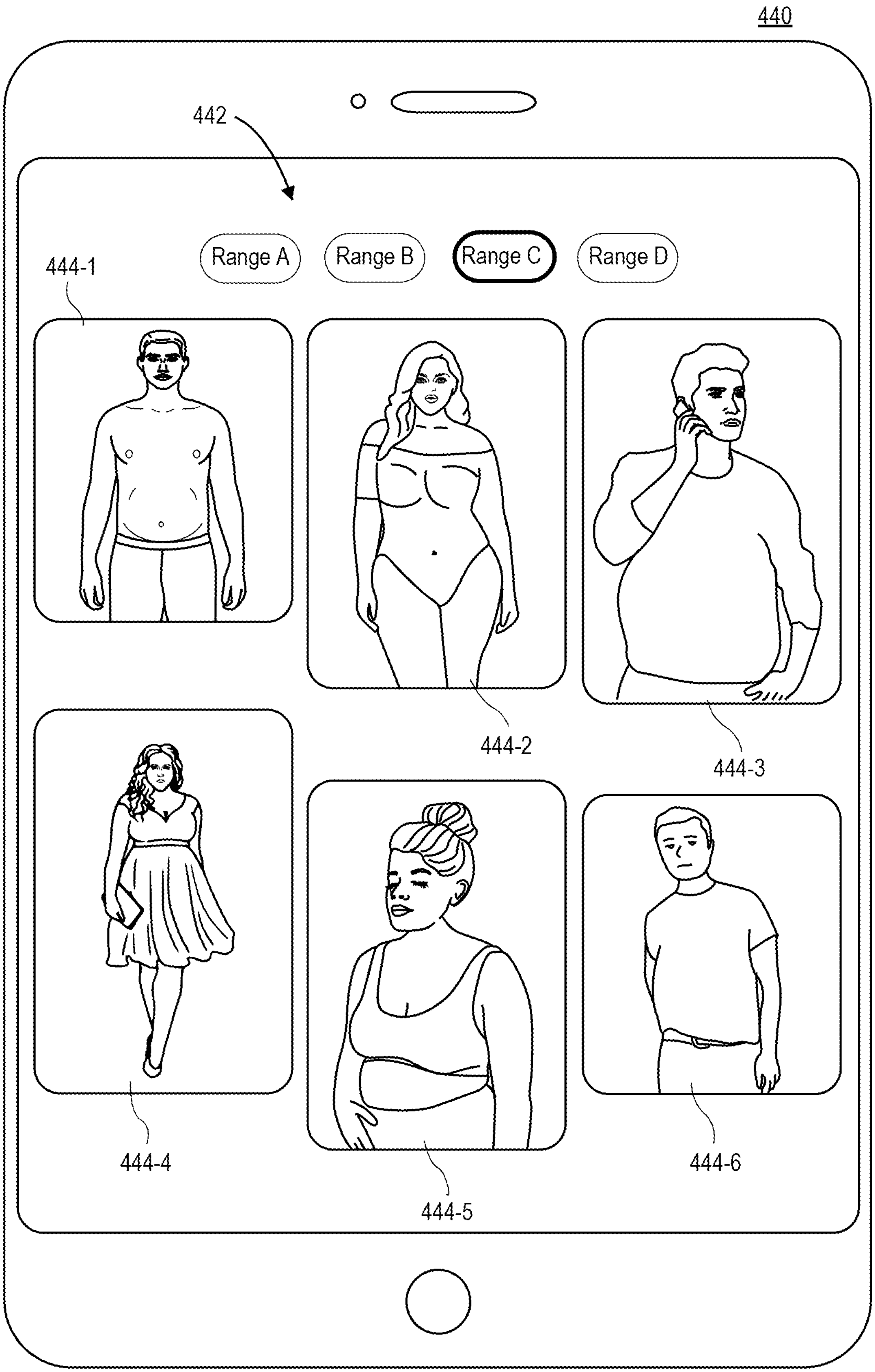

As shown in FIG. 4D, user interface 440 may include body type range filter control 442 and content items 444-1, 444-2, 444-3, 444-4, 444-5, and 444-6. User interface 440 illustrated in FIG. 4D may be presented to the user subsequent to presentation of user interface 400 shown in FIG. 4A (or any of FIG. 4B, 4C, or 4E) after the user has made a body type range option selection via an interaction with body type range filter control 442.

For example, as shown in FIG. 4D, the RANGE C body type range option is highlighted in body type range filter control 442, indicating that the user has selected the RANGE C body type range option via an interaction with body type range filter control 442. Accordingly, the content items that were identified as being responsive to the query are filtered by the user's choice of the RANGE C body type range option, and only the content items associated with the RANGE C body type range may be presented via user interface 440 to the user. Alternatively and/or in addition, in implementations where the initial responsive content items do not include a sufficient number of content items associated with the RANGE C body type range, additional responsive content items associated with the RANGE C body type range may also be identified (e.g., from the corpus of content items such as content items 132). Thus, content items 444-1, 444-2, 444-3, 444-4, 444-5, and 444-6, which are presented to the user via user interface 440, may all be associated with the RANGE C body type range. Further, the filtered content items, i.e., content items 444-1, 444-2, 444-3, 444-4, 444-5, and 444-6, may have been selected and arranged in the presentation shown in FIG. 4D to ensure that the user is presented with a diverse set of content items based on one or more attributes (e.g., other than body type) such as, for example, hair pattern, skin tone, gender, age, geographic location, or any other attributes associated with the content items to ensure that a diverse set of content items are presented to the user. The diversification of the content items may have been determined using or more of diversification heuristics, a maximal marginal relevance (MMR) approach, a determinantal point processes (DPP), other trained machine learning models and/or probabilistic models, or other algorithms or techniques. Accordingly, content items 444-1, 444-2, 444-3, 444-4, 444-5, and 444-6 may be selected, sorted, arranged, and/or presented based on diversity, in addition to filtering, relevance, and/or responsiveness to the query.

Figure 4E:
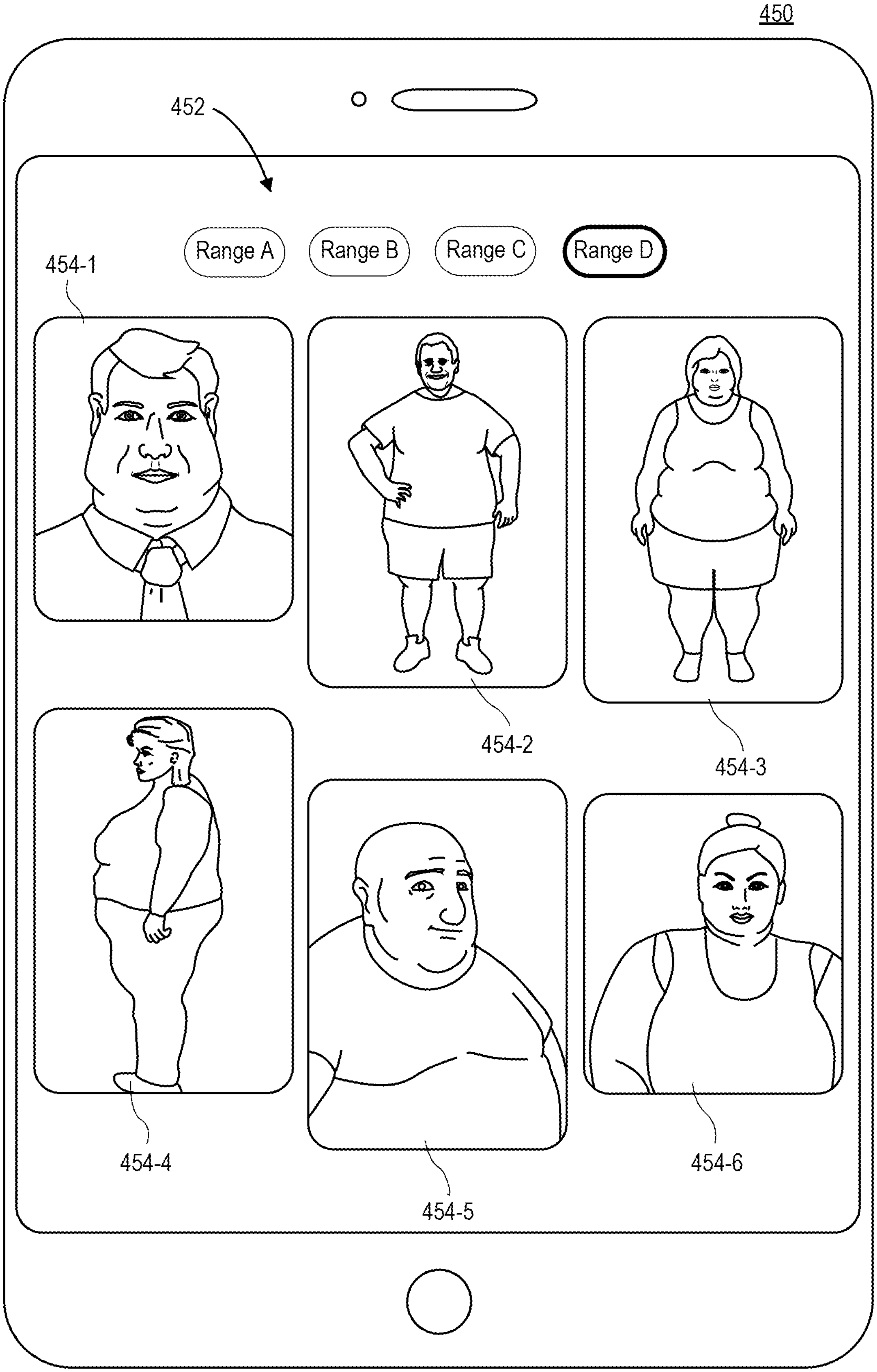

As shown in FIG. 4E, user interface 450 may include body type range filter control 452 and content items 454-1, 454-2, 454-3, 454-4, 454-5, and 454-6. User interface 450 illustrated in FIG. 4E may be presented to the user subsequent to presentation of user interface 400 shown in FIG. 4A (or any of FIGS. 4B-4D) after the user has made a body type range option selection via an interaction with body type range filter control 452.

For example, as shown in FIG. 4E, the RANGE D body type range option is highlighted in body type range filter control 452, indicating that the user has selected the RANGE D body type range option via an interaction with body type range filter control 452. Accordingly, the content items that were identified as being responsive to the query are filtered by the user's choice of the RANGE D body type range option, and only the content items associated with the RANGE D body type range may be presented via user interface 450 to the user. Alternatively and/or in addition, in implementations where the initial responsive content items do not include a sufficient number of content items associated with the RANGE D body type range, additional responsive content items associated with the RANGE D body type range may also be identified (e.g., from the corpus of content items such as content items 132). Thus, content items 454-1, 454-2, 454-3, 454-4, 454-5, and 454-6, which are presented to the user via user interface 450, may all be associated with the RANGE D body type range. Further, the filtered content items, i.e., content items 454-1, 454-2, 454-3, 454-4, 454-5, and 454-6, may have been selected and arranged in the presentation shown in FIG. 4E to ensure that the user is presented with a diverse set of content items based on one or more attributes (e.g., other than body type range) such as, for example, hair pattern, skin tone, gender, age, geographic location, or any other attributes associated with the content items to ensure that a diverse set of content items are presented to the user. The diversification of the content items may have been determined using one or more of diversification heuristics, a maximal marginal relevance (MMR) approach, a determinantal point processes (DPP), other trained machine learning models and/or probabilistic models, or other algorithms or techniques. Accordingly, content items 454-1, 454-2, 454-3, 454-4, 454-5, and 454-6 may be selected, sorted, arranged, and/or presented based on diversity, in addition to filtering, relevance, and/or responsiveness to the query.

Figure 5:
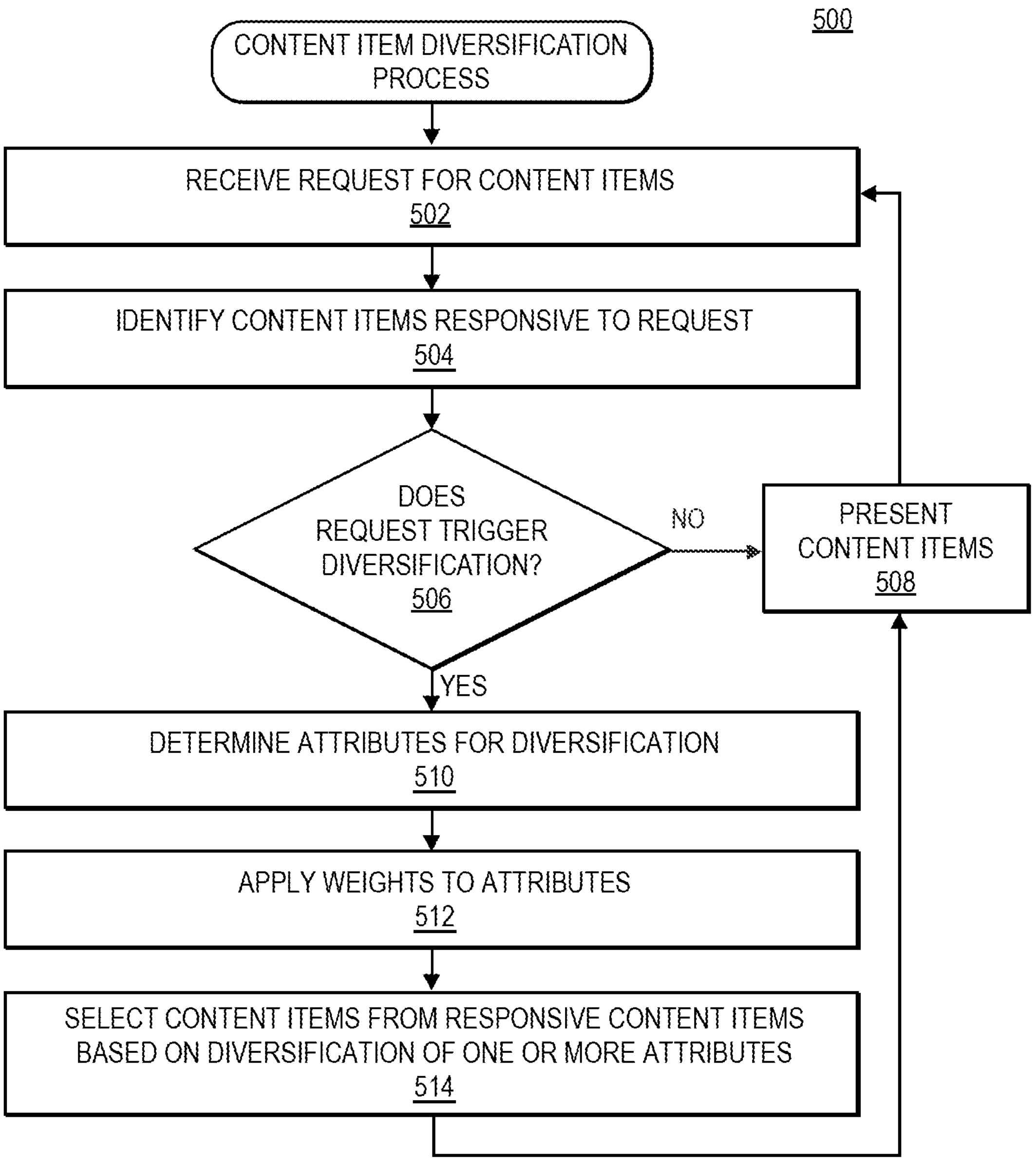
FIG. 5 is a flow diagram of an exemplary content item diversification process, according to exemplary embodiments of the present disclosure.

FIG. 5 is a flow diagram of an exemplary diversification process 500, according to exemplary embodiments of the present disclosure.

As shown in FIG. 5, exemplary diversification process 500 may begin with a request for content items, as in step 502. This may include, for example, a query (e.g., a text-based query, an image query, etc.), a request to access a homepage and/or home feed, a request for recommended content items, and the like. In step 504, content items that are responsive and/or relevant to the request for content items may be identified.

After the responsive and/or relevant content items have been identified, it may be determined, as in step 506, whether diversification of the content items is triggered. For example, the request for content items may be analyzed to determine if the request has relevance to diversifying content by various attributes/parameters, such as body type ranges (e.g., queries related to fashion, beauty, and the like), if the request is sufficiently generic to allow diversifying by body types and other attributes/parameters (e.g., the request is sufficiently generic—does not include keywords directed to a specific body type range, etc.), and the like. In exemplary embodiments, keywords and/or queries that may trigger diversification of responsive content items based on body type ranges (or other attributes/parameters) may be maintained, and the request and/or query received in step 502 may be compared against the maintained keywords and/or queries. Alternatively and/or in addition, a trained machine learning model configured to determine query intent may be employed to determine whether the query triggers diversification of content based on body type ranges (or other attributes/parameters). Additionally, it may further be determined whether the queries include sufficient inventory of responsive content items associated with at least one of the body type ranges so as to facilitate diversification of content based on body type ranges (or other attributes/parameters).

If it is determined that a certain request and/or query does not trigger diversification of content based on body type ranges (or other attributes/parameters), the content items may simply be presented, as in step 508. Alternatively, if diversification of content based on body type ranges (or other attributes/parameters) is triggered, in step 510, the attributes/parameters that may be utilized for diversification of the content items may be determined. The diversification attributes/parameters may include, for example, body type ranges, skin tone, gender, age, geographic location, or any other attributes/parameters associated with the content items to ensure that a diverse set of content items are presented to the user.

In step 512, weights may be applied to the various attributes/parameters for which the content items may be diversified. In exemplary implementations where equal diversification is desired across all the attributes/parameters, equal weights may be applied to each attribute/parameter. Based on the weightings and attributes/parameters, the content items may be selected from the responsive content items to ensure that a diverse set of content items are presented to the user. In exemplary implementations, the diversifying the content items can be determined using diversification heuristics, a maximal marginal relevance (MMR) approach, a determinantal point processes (DPP) approach, other trained machine learning models and/or probabilistic models, or other algorithms or techniques. Accordingly, content items may be selected, sorted, arranged, and/or presented based on diversification based on the various attributes, as in step 514. After content items have been selected in step 514 to ensure that a diverse set of content items are presented to the user, process 500 may return to step 508, so that the content items are presented to the user.

Figure 6A:
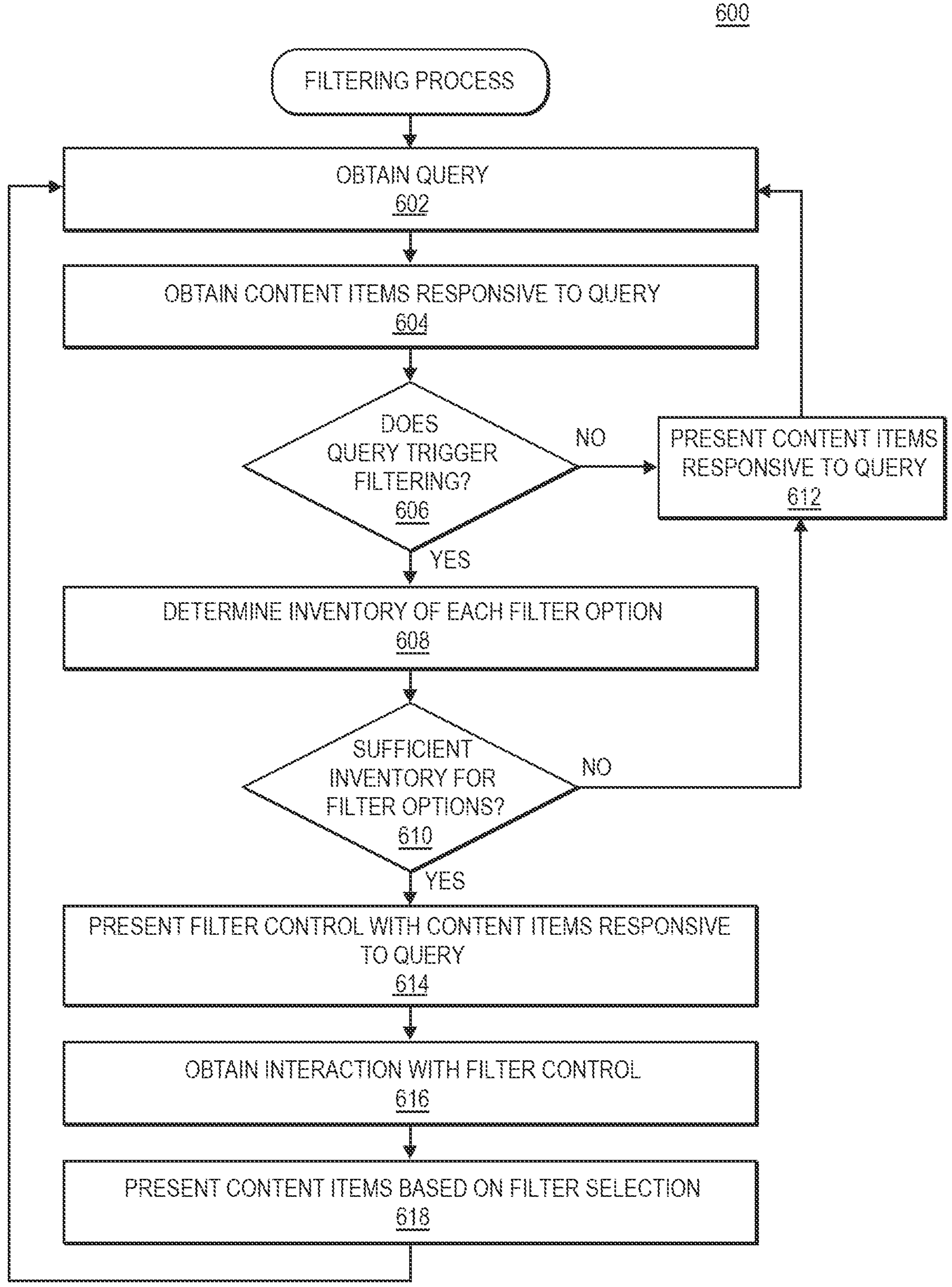
FIG. 6A is a flow diagram of an exemplary filtering process, according to exemplary embodiments of the present disclosure.

FIG. 6A is a flow diagram of an exemplary filtering process 600, according to exemplary embodiments of the present disclosure.

As shown in FIG. 6A, process 600 may begin at step 602, where a query may be obtained from a user. For example, a user may submit a query via a client device (e.g., client devices 110) in connection with a search for content items. In step 604, content items responsive to the query may be obtained. For example, an online service (e.g., online service 125) may identify content items from a corpus of content items (e.g., content items 132) that may be responsive and/or relevant to the query. The relevant content items may be identified, for example, based on embedding vectors, attributes, metadata, etc. associated with the content items and the query, and may utilize various clustering algorithms, similarity metrics, and the like. According to certain aspects of the present disclosure, the identified content items may be ranked according to relevance to the query.

Additionally, the query may be processed to determine whether the submitted query may trigger filtering of the identified content items based on body type ranges, as in step. 606. For example, the query may be analyzed to determine if the query has relevance to filtering by body type ranges (e.g., queries related to fashion, beauty, hairstyles, makeup, and the like), if the query is sufficiently generic to allow filtering by body type ranges (e.g., the query does not include keywords directed to a specific body type range, etc.), and the like.

In the event that it is determined that the query does not trigger filtering based on body type ranges, the content items identified in step 604 as being relevant and/or responsive to the query may be presented to the user, as in step 612. Accordingly, a query unrelated to body type ranges and/or likely to identify responsive content items that do not include representations of body type ranges may not trigger filtering based on body type ranges.

If it has been determined that the query triggers filtering based on body type ranges, an inventory of the responsive content items in each body type range may be determined, as in step 608. For example, the number of content items in the responsive content items identified in step 604 that are associated with each body type range may be determined. This can include an absolute number, a relative number (e.g., to the inventory of each body type range), a proportional number (e.g., relative to the total number of responsive content items identified in step 604), etc. The inventory for each body type range may be used to determine whether to enable filtering based on the body type ranges that may be made available for filtering. For example, if the determined inventory indicates that the responsive content items only include a single type of body type range, filtering based on body type ranges may not be made available, since only one body type range is included in the responsive content items. In such a scenario, the content items identified in step 604 as being relevant and/or responsive to the query may be presented to the user, as in step 612.

In the event that sufficient inventory exists for at least two body type ranges, as in step 610, filtering based on body type ranges may be enabled and made available for body type ranges for which sufficient inventory exists. For example, if it is determined that sufficient inventory exists for three body type ranges, filtering based on the three body type ranges having sufficient inventory may be made available, while filtering based on body type ranges not having sufficient inventory may not be made available. According to exemplary implementations, the determined inventory for each body type range may be compared against a threshold to determine whether sufficient inventory exists for each body type range. The threshold value may include a predetermined value, a ratio or relative value based on the total number of responsive content items and/or the inventory for each body type range, and the like.

After it has been determined that sufficient inventory exists to enable filtering based on at least two of the body type ranges, in step 614, a filter control may be presented, via a user interface, along with the responsive content items to the user. According to exemplary implementations of the present disclosure, the content items presented to the user may be selected to ensure presentation of a diverse set of content items based on one or more attributes (e.g., body type ranges, etc.) associated with the content items. For example, the ranking of the responsive content items identified in step 604 may also include a diversification component based on one or more attributes such as, for example, body type ranges, hair pattern, skin tone, gender, age, geographic location, or any other attributes associated with the content items to ensure that a diverse set of content items are presented to the user. The diversification component can be determined using diversification heuristics, a maximal marginal relevance (MMR) approach, a determinantal point processes (DPP), other trained machine learning models and/or probabilistic models, or other algorithms or techniques. Further, the diversification component may be determined in batch. Accordingly, the identified content items may be sorted and selected based on diversity, in addition to relevance and responsiveness to the query, and presented to the user such that the presented content items are diverse, as well as relevant and responsive to the query.

In step 616, an interaction with the filter control may be received, indicating a selection of one or more body type ranges. For example, the user may have selected one or more body type ranges. In response, the presented content items may be filtered based on the body type ranges selected by the user, such that only the content items associated with the selected body type ranges may be presented, as in step 618.

In an exemplary implementation where the user interacted with the body type range control to select a first body type range, only the content items associated with the first body type range may be presented to the user. Similarly, in an exemplary implementation where the user has selected first and second body type ranges via an interaction with the body type ranges filter control, only the content items associated with the first and second body type ranges may be presented to the user. Additionally, the filtered content items presented to the user based on the selected body type ranges may be presented based at least in part on a diversity ranking associated with the filtered content items to ensure that the filtered content items presented to the user also include a diverse set of content items.

Figure 6B:
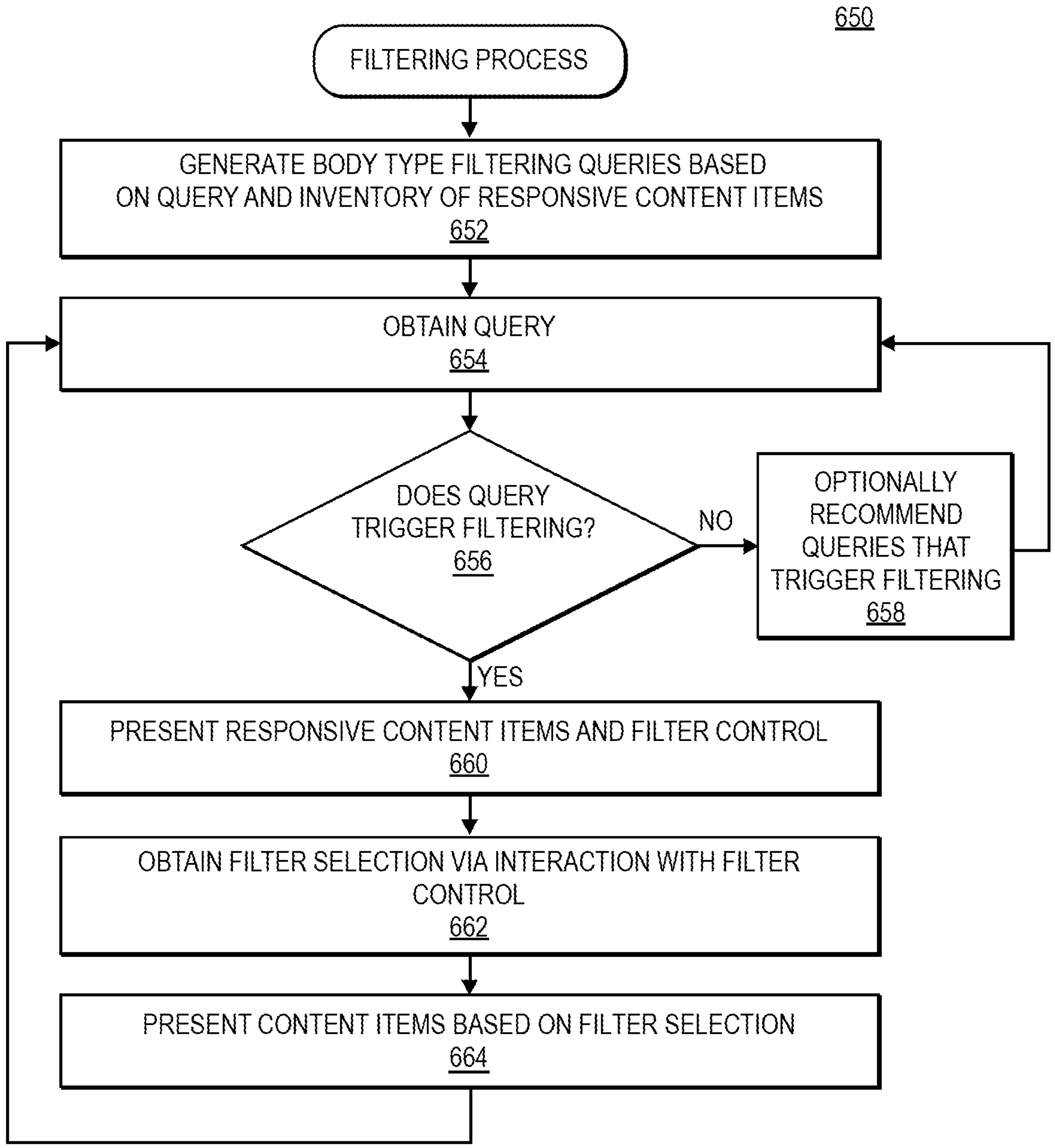
FIG. 6B is a flow diagram of an exemplary filtering process, according to exemplary embodiments of the present disclosure.

FIG. 6B is a flow diagram of an exemplary filtering process 650, according to exemplary embodiments of the present disclosure.

As shown in FIG. 6B, process 650 may begin at step 652, where a corpus of body type range filtering queries may be generated and maintained. For example, queries may be processed to identify queries that have relevance to filtering by body type ranges (e.g., queries related to fashion, beauty, hairstyles, makeup, and the like), are sufficiently generic to allow filtering by body type ranges (e.g., the query does not include keywords directed to a specific body type ranges, etc.), and include sufficient inventory of responsive content items associated with at least one of the body type ranges, so as to facilitate filtering based on body type ranges. According to certain aspects of the present disclosure, determination of whether a query triggers filtering by body type ranges may be different based on geography, location, etc. Accordingly, the identified queries may be used to generate, store, and maintain a corpus of queries that may trigger filtering based on body type ranges, which may be periodically updated (e.g., as additional content items become available, etc.). Alternatively, if it is determined that a certain query is not relevant to filtering based on body type ranges and/or does not include sufficient inventory for one or more of the body type ranges, then it may be determined that the query in question does not trigger filtering based on body type ranges and may be excluded from the corpus of queries.

In step 654, a query may be obtained from a user. For example, a user may submit a query via a client device (e.g., client devices 110) in connection with a search for content items. The query may be processed, in step 656, to determine whether the submitted query may trigger filtering of the identified content items based on body type ranges. For example, the received query may be processed to determine whether the received query is included in the corpus of triggering queries. If the received query is included in the corpus of triggering queries, filtering based on body type ranges may be triggered, whereas if the received query is not included in the corpus of triggering queries, filtering based on body type ranges may not be triggered. If it is determined that the received query is not included in the corpus of triggering queries, such that filtering based on body type ranges is not triggered, one or more recommended queries (e.g., as an autocomplete suggestion, etc.) from the corpus of triggering queries that may trigger filtering based on body type ranges may be optionally recommended and presented, as in step 658.

In step 660, content items relevant and/or responsive to the query may be identified and presented to the user, along with a filter control. According to exemplary implementations of the present disclosure, the content items presented to the user may be selected to ensure presentation of a diverse set of content items based on one or more attributes (e.g., body type ranges, etc.) associated with the content items.

In step 662, an interaction with the filter control may be received, indicating a selection of one or more body type ranges. For example, the user may have selected one or more body type ranges. In response, the presented content items may be filtered based on the body type ranges selected by the user such that only the content items associated with the body type ranges may be presented, as in step 664. In an exemplary implementation where the user interacted with the body type ranges filter control to select a first body type range, only the content items associated with the first body type range may be presented to the user. Similarly, in an exemplary implementation where the user has selected first and second body type ranges via an interaction with the body type range filter control, only the content items associated with the first and second body type ranges may be presented to the user. Additionally, the filtered content items presented to the user based on the selected body type range may be presented based at least in part on a diversity ranking associated with the filtered content items to ensure that the filtered content items presented to the user also include a diverse set of content items. Process 650 may then return to step 654 to process a further query.

Figure 7:
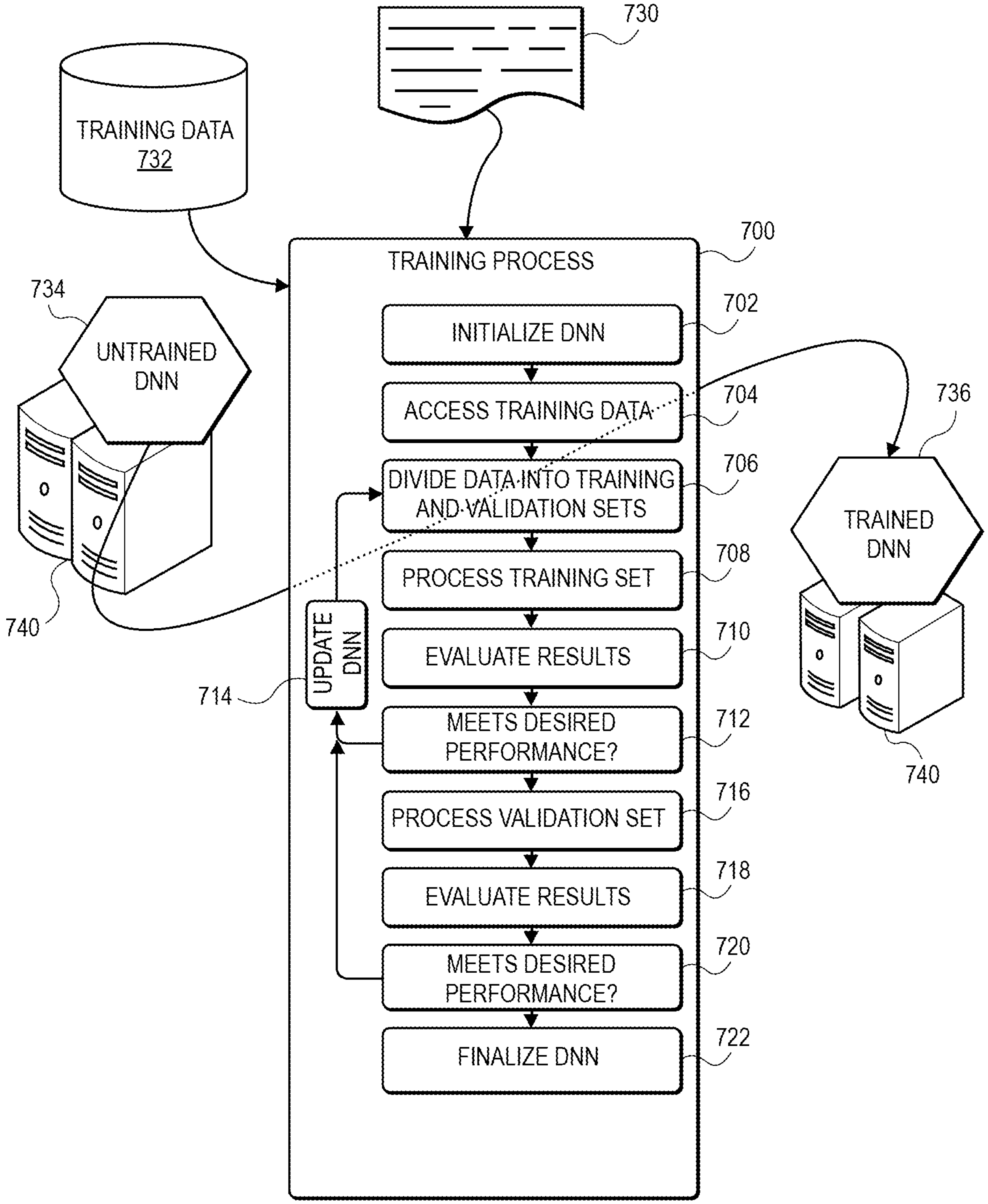
FIG. 7 is a flow diagram of an exemplary deep neural network training process, according to exemplary embodiments of the present disclosure.

FIG. 7 is a flow diagram of an exemplary training process 700 for training a DNN (or other machine learning model), according to exemplary embodiments of the present disclosure.

As shown in FIG. 7, training process 700 is configured to train an untrained DNN 734, operating on computer system 740, to transform untrained DNN 734 into trained DNN 736 that operates on the same or another computer system, such as online service 125. In the course of training, as shown in FIG. 7, at step 702, untrained DNN 734 is initialized with training criteria 730. Training criteria 730 may include, but is not limited to, information as to a type of training, number of layers to be trained, candidate labels, etc.

At step 704 of training process 700, corpus of labeled training data 732 may be accessed. For example, in the exemplary implementations where the training is to generate a trained DNN that generates body type prediction scores for a plurality of body type ranges, labeled training data 732 may include labeled content items presenting the various body type ranges, and the like. According to certain aspects of the present disclosure, labeled training data 732 may include content items that are labeled by multiple sources and an aggregation of the multiple labels (e.g., mean, median, mode, etc.) may be used as the label for each item of labeled training data 732. Further, labeled training data 732 may include a sufficiently diverse set of labeled training data to ensure that a sufficient representation of fringe and/or borderline labeled content is included.

The disclosed implementations discuss the use of labeled training data, meaning that the actual results of processing of the data items of the corpus of training data (i.e., whether the data corresponds to a positive or negative presence of a condition) are known. Of course, in various implementations, labeled training data 732 may also or alternatively include unlabeled training data.

With training data 732 accessed, at step 706, labeled training data 732 is divided into training and validation sets. Generally speaking, the items of data in the training set are used to train untrained DNN 734 and the items of data in the validation set are used to validate the training of the DNN. As those skilled in the art will appreciate, and as described below in regard to much of the remainder of training process

700, there are numerous iterations of training and validation that occur during the training of the DNN.

At step 708 of training process 700, the data items of the training set are processed, often in an iterative manner. Processing the data items of the training set includes capturing the processed results. After processing the items of the training set, at step 710, the aggregated results of processing the training set are evaluated, and at step 712, a determination is made as to whether a desired performance has been achieved. If the desired performance is not achieved, in step 714, aspects of the machine learning model are updated in an effort to guide the machine learning model to generate more accurate results, and processing returns to step 706, where a new set of training data is selected, and the process repeats. Alternatively, if the desired performance is achieved, training process 700 advances to step 716.

At step 716, and much like step 708, the data items of the validation set are processed, and at step 718, the processing performance of this validation set is aggregated and evaluated. At step 720, a determination is made as to whether a desired performance, in processing the validation set, has been achieved. If the desired performance is not achieved, the process returns to step 714, where aspects of the machine learning model are updated in an effort to guide the machine learning model to generate more accurate results, and then processing returns to step 706. Alternatively, if the desired performance is achieved, the training process 700 advances to step 722.

At step 722, a finalized, trained DNN 736 is generated for body type ranges and/or body type prediction scores. Typically, though not exclusively, as part of finalizing the now-trained DNN 736, portions of the DNN that are included in the model during training for training purposes are extracted, thereby generating a more efficient trained DNN 736.

Figure 8:
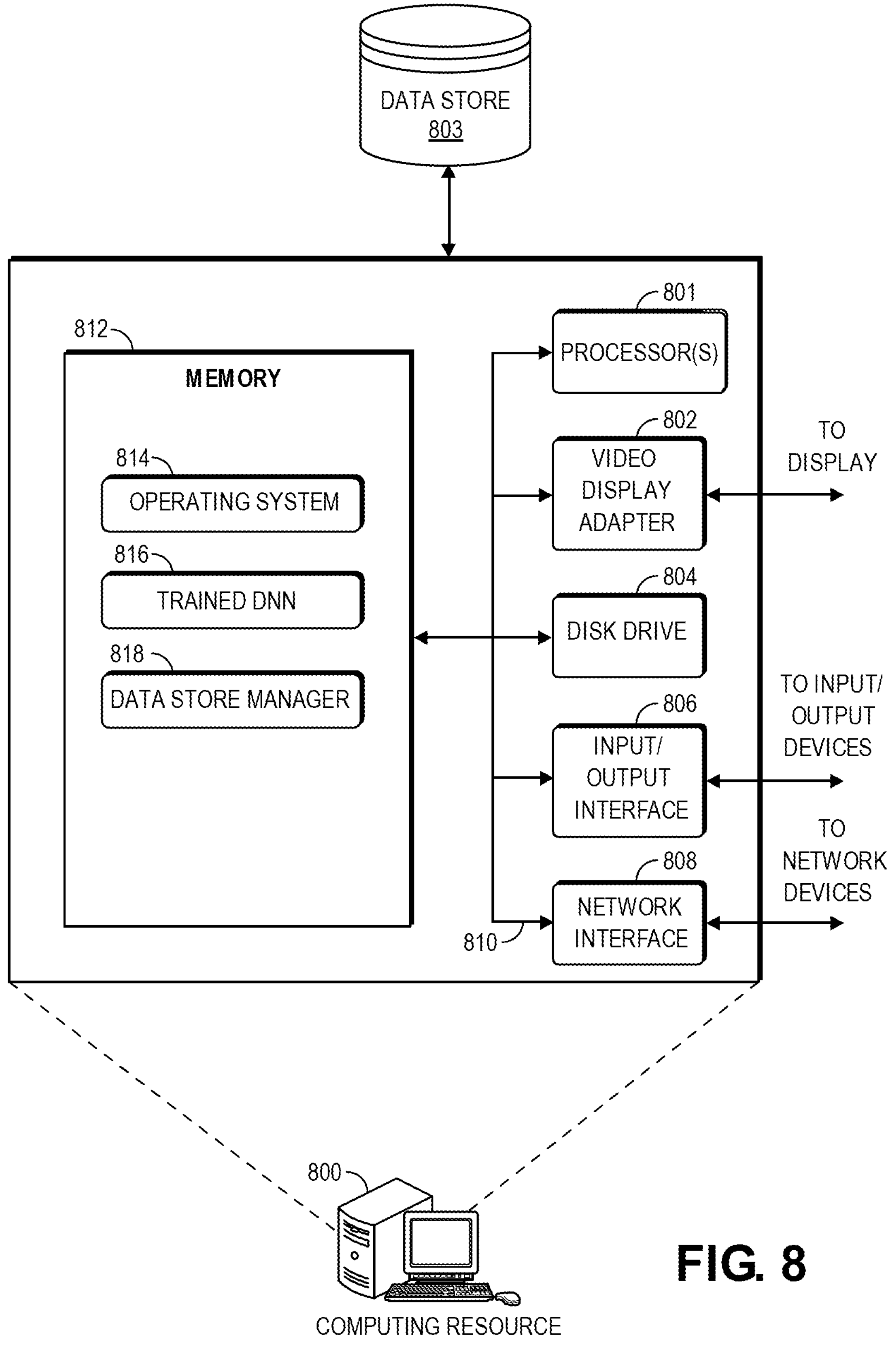
FIG. 8 is an illustration of an exemplary computing resource, according to exemplary embodiments of the present disclosure.

FIG. 8 is a pictorial diagram of an illustrative implementation of a computing resource 800 that may be used with one or more of the implementations described herein. Computing resource 800 may include one or more processors 801, such as one or more redundant processors, video display adapter 802, disk drive 804, input/output interface 806, network interface 808, and memory 812. Processor(s) 801, video display adapter 802, disk drive 804, input/output interface 806, network interface 808, and memory 812 may be communicatively coupled to each other by communication bus 810.

Video display adapter 802 provides display signals to a local display permitting an operator of computing resource 800 to monitor and configure operation of computing resource 800. Input/output interface 806 likewise communicates with external input/output devices not shown in FIG. 8, such as a mouse, keyboard, scanner, or other input and output devices that can be operated by an operator of computing resource 800. Network interface 808 includes hardware, software, or any combination thereof, to communicate with other computing devices. For example, network interface 808 may be configured to provide communications between computing resource 800 and other computing devices, such as client devices 110.

Memory 812 generally comprises random access memory (RAM), read-only memory (ROM), flash memory, and/or other volatile or permanent memory. Memory 812 is shown storing operating system 814 for controlling the operation of computing resource 800. Computing resource 800 may also include trained DNN 816, as discussed herein. In some implementations, trained DNN 816 may determine body type ranges according to the implementations described herein. In other implementations, trained DNN 816 may exist on both computing resource 800 and/or each client device.

Memory 812 additionally stores program code and data for providing network services that allow client devices and external sources to exchange information and data files with computing resource 800. Memory 812 may also include interactive trained DNN 816, which may communicate with data store manager application 818 to facilitate data exchange and mapping between data store 803, user/client devices, such as client devices 110, external sources, etc.

As used herein, the term "data store" refers to any device or combination of devices capable of storing, accessing and retrieving data, which may include any combination and number of data servers, databases, data storage devices and data storage media, in any standard, distributed or clustered environment. Computing resource 800 can include any appropriate hardware and software for integrating with data store 803 as needed to execute aspects of one or more applications for the client device 110, the external sources, etc.

Data store 803 can include several separate data tables, databases or other data storage mechanisms and media for storing data relating to a particular aspect. For example, data store 803 illustrated includes digital items (e.g., images) and corresponding metadata (e.g., image segments, popularity, source) about those items.

It should be understood that there can be many other aspects that may be stored in data store 803, which can be stored in any of the above listed mechanisms as appropriate or in additional mechanisms of any of the data store. Data store 803 may be operable, through logic associated therewith, to receive instructions from computing resource 800 and obtain, update or otherwise process data in response thereto.

Computing resource 800, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, media files, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some, or all of the specific details and steps disclosed herein.

Moreover, with respect to the one or more methods or processes of the present disclosure shown or described herein, including but not limited to the flow charts shown in FIGS. 3, 5, 6A, 6B, and 7, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
- obtaining a first plurality of content items;
- for one or more content items of the first plurality of content items:
  - obtaining an embedding vector representative of one or more respective content item;
  - processing, using a trained machine learning model, the embedding vector, to determine a body type classification for the content item; and
  - associating the body type classification with the respective content item;
- determining, based at least in part on a query received from a client device, a second plurality of content items from the first plurality of content items, wherein the second plurality of content items are responsive to the query;
- causing at least a portion of the second plurality of content items and a body type classification filter control including a plurality of user selectable body type ranges to be concurrently presented on the client device;
- obtaining, via a user interaction with the body type classification filter control, a selection of a first body type range from the plurality of selectable body type ranges;
- determining, based at least in part on the first body type range, a third plurality of content items, such that content items of the third plurality of content items are associated with the user selected first body type range; and
- causing at least a portion of the third plurality of content items to be presented on the client device.

2. The computer-implemented method of claim 1, wherein at least the portion of the second plurality of content items is presented on the client device according to a diversity of body type classifications associated with the second plurality of content items.

3. The computer-implemented method of claim 1, wherein:
- processing the embedding vector to determine the body type classification for the content item includes determining a plurality of body type range prediction scores for the content item; and
- wherein one or more of the plurality of body type range prediction scores correspond to a body type range.

4. The computer-implemented method of claim 3, wherein:
- associating the body type classification with the respective content item includes associating a first body type range corresponding to a highest body type range prediction score of the plurality of body type range prediction scores to the content item.

5. The computer-implemented method of claim 3, wherein associating the body type classification with the respective content item includes:

comparing one or more of the plurality of body type range predictions scores against a threshold; and associating second body type ranges corresponding to body type range prediction scores of the plurality of body type range prediction scores that exceed the threshold.

6. The computer-implemented method of claim 1, further comprising:

obtaining, via a second interaction with the body type classification filter control, a second body type range from the plurality of selectable body type ranges, wherein determining the third plurality of content items from the second plurality of content items is further based on the body type range, such that content items of the third plurality of content items are associated with at least one of the first body type range or the second body type range.

7. A computing system, comprising:

one or more processors;

a memory storing program instructions that, when executed by the one or more processors, cause the one or more processors to at least:

obtain a first plurality of content items, one or more content items of the first plurality of content items being associated with a respective body type range, wherein one or more of the respective body type ranges was determined by a trained machine learning model;

determine a second plurality of content items from the first plurality of content items that are responsive to a query received from a client device;

determine, based at least in part on the query, that the query triggers body type range filtering of the second plurality of content items;

in response to the determination that the query triggers body type range filtering of the second plurality of content items, cause a body type range filter control and at least a portion of the second plurality of content items to be concurrently presented on the client device, wherein the body type range filter control presents a plurality of selectable body type ranges;

obtain a user interaction with the body type range filter control selecting a first body type range from the plurality of selectable body type ranges; and cause at least a portion of a third plurality of content items from the second plurality of content items to be presented on the client device, wherein content items of the third plurality of content items are associated with the selected first body type range.

8. The computing system of claim 7, wherein determining that the query triggers body type range filtering further includes, at least:

determining that an inventory of content items of the second plurality of content items associated with at least one of the plurality of selectable body type ranges exceeds a threshold.

9. The computing system of claim 7, wherein the program instructions, that when executed by the one or more processors, further cause the one or more processors to at least:

determine a fourth plurality of content items from the first plurality of content items that are responsive to a second query;

determine that an inventory of content items of the fourth plurality of content items associated with at least one selectable body type range from the plurality of selectable body type ranges does not exceed a threshold; and determine, based at least in part on the determination that the inventory of content items of the fourth plurality of content items associated with at least one selectable body type range from the plurality of selectable body type ranges does not exceed the threshold, that the second query does not trigger body type range filtering of the fourth plurality of content items.

10. The computing system of claim 7, wherein the program instructions, that when executed by the one or more processors, further cause the one or more processors to at least:

determine a diversification component in connection with the respective body type ranges associated with the second plurality of content items; and cause at least a portion of the second plurality of content items to be presented on the client device in an arrangement based at least in part on the diversification component.

11. The computing system of claim 10, wherein:

the diversification component is further based at least in part on a second parameter; and the second parameter includes at least one of a skin tone or a hair pattern.

12. The computing system of claim 7, wherein the body type range associated with one or more content items of the first plurality of content items is a primary body type range presented in the one or more content items.

13. The computing system of claim 7, wherein one or more of the first plurality of content items is associated with more than one respective body type range.

14. The computing system of claim 7, wherein:

the determination of a body type range for a content items of the first plurality of content items includes determining a plurality of body type range prediction scores for the content item of the first plurality of content items; and the plurality of body type range prediction scores corresponds to the respective body type ranges.

15. The computing system of claim 7, wherein the determination of the body type range for a content item of the first plurality of content items includes:

processing an embedding vector representative of the content item of the first plurality of content items by the trained machine learning model, wherein the embedding vector includes a representation of the content item of the first plurality of content items.

16. A computer-implemented method, comprising:

obtaining a first plurality of content items, one or more of the first plurality of content items being associated with a respective body type range, wherein one or more respective body type range was determined by a trained machine learning model;

determining a second plurality of content items from the first plurality of content items that are responsive to a query received from a client device;

determining, based at least in part on the query, that the query triggers body type range diversification of the second plurality of content items;

in response to the determination that the query triggers body type range diversification of the second plurality of content items, causing a plurality of user selectable body type ranges and a first portion of the second plurality of content items to be presented on the client device based at least in part on the respective body type ranges associated with the second plurality of content items, such that the presented first portion of the second plurality of content items includes a diverse selection of respective body type ranges;

receiving an input indicating a user selection of a first body type range of the plurality of user selectable body type ranges; and filtering the presented content items from the second plurality of content items according to the first body type range.

17. The computer-implemented method of claim 16, wherein:

at least a portion of the second plurality of content items is associated with more than one respective body type ranges;

the more than one respective body type ranges includes a respective primary body type range; and the diverse selection of respective body type ranges is based at least in part on the respective primary body type ranges.

18. The computer-implemented method of claim 16, wherein determining that the query triggers body type range diversification of the second plurality of content items includes at least one of:

determining a query intent associated with the query; or determining that the query or at least one keyword included in the query is included in a predetermined list of keywords and queries.

19. The computer-implemented method of claim 16, wherein the plurality of selectable body type ranges is presented on the client device concurrently with the first portion of the second plurality of content items;

wherein filtering the presented content items includes determining, based at least in part on the first body type range, a third plurality of content items from the second plurality of content items, wherein content items of the third plurality of content items are associated with the first body type range; and the method further comprising: causing at least a portion of the third plurality of content items to be presented on the client device.

20. The computer-implemented method of claim 16, further comprising:

training the machine learning model to determine a plurality of body type range prediction scores for a plurality of body type ranges in connection with individuals represented in a content item without performing preprocessing on the content item.

21. The computer-implemented method of claim 1, further comprising:

determining that the second plurality of content items includes a threshold number of content items having associated body type classifications belonging to respective body type ranges of one or more body type ranges; and causing at least the portion of the second plurality of content items and the body type classification filter control to be concurrently presented in response to the determining that the second plurality of content items includes the threshold number of content items.

* * * * *